US012021770B2

United States Patent
Fei et al.

(10) Patent No.: US 12,021,770 B2
(45) Date of Patent: Jun. 25, 2024

(54) METHOD AND DEVICE TO PROVIDE A REFERENCE SIGNAL SENDING OR RECEIVING MECHANISM

(71) Applicant: HUAWEI TECHNOLOGIES CO., LTD., Guangdong (CN)

(72) Inventors: Yongqiang Fei, Shenzhen (CN); Zhiheng Guo, Beijing (CN); Xinqian Xie, Beijing (CN); Wenping Bi, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 622 days.

(21) Appl. No.: 17/158,274

(22) Filed: Jan. 26, 2021

(65) Prior Publication Data

US 2021/0152309 A1   May 20, 2021

Related U.S. Application Data

(63) Continuation of application No. PCT/CN2019/098053, filed on Jul. 27, 2019.

(30) Foreign Application Priority Data

Jul. 27, 2018 (CN) .......................... 201810848338.0

(51) Int. Cl.
*H04L 5/00* (2006.01)
*H04W 72/0453* (2023.01)

(52) U.S. Cl.
CPC .......... *H04L 5/0048* (2013.01); *H04L 5/0092* (2013.01); *H04W 72/0453* (2013.01)

(58) Field of Classification Search
CPC ....... H04L 5/0048; H04L 5/0092; H04L 5/00; H04L 5/0094; H04L 5/0058; H04W 72/0453; H04W 72/27
See application file for complete search history.

(56) References Cited

U.S. PATENT DOCUMENTS

2016/0020893 A1   1/2016  Tong et al.
2021/0126816 A1*  4/2021  Davydov .............. H04L 5/0091
(Continued)

FOREIGN PATENT DOCUMENTS

CN        103582129 A      2/2014
CN        107483166    *  12/2017
(Continued)

OTHER PUBLICATIONS

ZTE et al., "Discussion on Measurements and RS Design for CLI Mitigation", 3GPP TSG RAN WG1 Meeting #88bis R1-1704434, Spokane, Washington, USA, Apr. 3-7, 2017, Total 11 Pages.
(Continued)

*Primary Examiner* — Mewale A Ambaye
(74) *Attorney, Agent, or Firm* — WOMBLE BOND DICKINSON (US) LLP

(57) ABSTRACT

This application provides a reference signal sending method, a reference signal receiving method, an apparatus, and a device, to provide a reference signal sending or receiving mechanism. A first network device determines at least one frequency reference point. The first network device generates a reference signal based on the at least one frequency reference point, and sends the reference signal in the first frequency band. A frequency reference point is determined based on a frequency band. In this case, both the first network device that sends the reference signal and a second network device that receives the reference signal may determine the frequency reference point based on the frequency band, and the two network devices may determine a same reference signal at a same frequency domain location, so that the reference signal sent by the first network device can be correctly detected by the second network device.

12 Claims, 10 Drawing Sheets

(56) References Cited

U.S. PATENT DOCUMENTS

2021/0306220 A1* 9/2021 Xu .................. H04L 41/0896
2022/0287035 A1* 9/2022 Yang .................. H04L 5/001

FOREIGN PATENT DOCUMENTS

| | | |
|---|---|---|
| CN | 107483166 A | 12/2017 |
| CN | 107733609 A | 2/2018 |
| CN | 108282254 A | 7/2018 |
| CN | 108289311 A | 7/2018 |
| EP | 2673996 B1 | 1/2017 |
| WO | 2015043633 A1 | 4/2015 |
| WO | 2018126448 A1 | 7/2018 |
| WO | 2018128851 A2 | 7/2018 |

OTHER PUBLICATIONS

3GPP TS 36.521-1 V13.0.1 (Jan. 2016), 3rd Generation Partnership Project; Technical Specification Group Radio Access Network;Evolved Universal Terrestrial Radio Access (E-UTRA); User Equipment (UE) conformance specification Radio transmission and reception Part 1: Conformance Testing;(Release 13), Total 95 Pages.

3GPP TS 38.101-1 V15.2.0 (Jun. 2018);3rd Generation Partnership Project; Technical Specification Group Radio Access Network;NR;User Equipment (UE) radio transmission and reception;Part 1: Range 1 Standalone(Release 15);total 126 pages.

3GPP TS 38.101-2 V15.2.0 (Jun. 2018); 3rd Generation Partnership Project; Technical Specification Group Radio Access Network;NR;User Equipment (UE) radio transmission and reception;Part 2: Range 2 Standalone(Release 15);total 68 pages.

3GPP TS 38.101-3 V15.2.0 (Jun. 2018);3rd Generation Partnership Project;Technical Specification Group Radio Access Network;NR;User Equipment (UE) radio transmission and reception;Part 3: Range 1 and Range 2 Interworking operation with other radios(Release 15);total 157 pages.

3GPP TS 38.211 V15.2.0 (Jun. 2018);3rd Generation Partnership Project;Technical Specification Group Radio Access Network;NR;Physical channels and modulation(Release 15);total 96 pages.

ZTE et al.,"Discussion on Measurement and RS Design for CLI Mitigation", 3GPP TSG RAN WG1 AH_NR#1 Meeting R1-1700271, Spokane, Washington, USA, Jan. 16-20, 2017, total 8 pages.

ZTE et al.,"Overview of Duplexing and Cross-link Interference Mitigation",3GPP TSG RAN WG1 Meeting#88 R1-1701613, Athens, Greece, Feb. 13-17, 2017, total 12 pages.

CMCC,"Motivation for Remote Interference Management in NR", 3GPP TSG RAN Meeting #79 RP-180310,Chennai, India, Mar. 19-22, 2018,total 8 pages.

CMCC,"Study on Remote Interference Management in NR",3GPP TSG RAN Meeting #79 RP-180311,Chennai, India, Mar. 19-22, 2018,total 4 pages.

Zukang Shen et al: Dynamic uplink-downlink configuration and interference management in TD-LTE , IEEE Communications Magazine, vol. 50, No. 11, Nov. 2012, pp. 51-59, XP011472335.

Guo Shaozhen et al: "Dynamic TDD and interference management towards 5G", 2018 IEEE Wireless Communications and Networking Conference (WCNC), IEEE, Apr. 15, 2018, pp. 1-6, XP033355309.

* cited by examiner

METHOD AND DEVICE TO PROVIDE A REFERENCE SIGNAL SENDING OR RECEIVING MECHANISM

CROSS-REFERENCE TO RELATED APPLICATION

This application is a continuation of International Application No. PCT/CN2019/098053, filed on Jul. 27, 2019, which claims priority to Chinese Patent Application No. 201810848338.0, filed on Jul. 27, 2018. The disclosures of the aforementioned applications are hereby incorporated by reference in their entireties.

TECHNICAL FIELD

This application relates to the field of communications technologies, and in particular, to a reference signal sending method, a reference signal receiving method, an apparatus, and a device.

BACKGROUND

In a wireless communications system such as a new radio (NR) system, a long term evolution (LTE) system, or an LTE-advanced (LTE-A) system, if a duplex mode of time division duplex (TDD) is used in the system, cross-link interference (CLI) may be generated between base stations (BS). The CLI between the base stations mainly means that a downlink (DL) signal sent by one base station interferes with an uplink (UL) signal of the other base station, and the uplink signal is, for example, a signal sent by user equipment (UE) to a base station. For example, when a first base station sends a downlink signal, a second base station is receiving an uplink signal, and the downlink signal sent by the first base station usually has relatively high power and may be received by the second base station. Consequently, the second base station is interfered with in receiving the uplink signal.

The CLI between the base stations usually occurs when transmission directions in two TDD cells served by the base stations that work at a same frequency are different. Therefore, if the transmission directions in the TDD cells remain the same, the CLI is usually not generated. However, there is also an exception. For example, for two base stations that are geographically far away from each other, even if transmission directions of the two base stations are the same, to be specific, the two base stations simultaneously receive an uplink signal and send a downlink signal, because the two base stations are geographically far away from each other, a significant delay is generated when the downlink signal sent by one base station arrives at the other base station, and the other base station may have switched to an uplink receiving direction. In this case, the CLI is also generated between the two base stations. To resolve the problem, measurement between base stations may be considered, so that an interfering base station can be identified. However, currently, there is no standardized mechanism for the measurement between base stations. In addition, even if the measurement between base stations can be currently performed according to a method for performing measurement between a base station and a terminal device, in the prior art, each base station independently configures a common reference point used, in frequency domain, to determine a reference signal, and different base stations may configure different common reference points. Therefore, two base stations determine different reference signals at a same frequency domain location. Consequently, a reference signal sent by one base station cannot be detected by the other base station, and, for example, to-be-completed subsequent work such as signal detection or channel measurement cannot be completed.

SUMMARY

Embodiments of this application provide a reference signal sending method, a reference signal receiving method, an apparatus, and a device, to provide a reference signal sending or receiving mechanism.

According to a first aspect, a reference signal sending method is provided. The method includes: determining at least one frequency reference point based on a first frequency band; generating a reference signal based on the at least one frequency reference point; and sending the reference signal in the first frequency band.

The method may be performed by a first communications apparatus. The first communications apparatus may be a network device or a communications apparatus that can support a network device in implementing functions required in the method. Certainly, the first communications apparatus may alternatively be another communications apparatus, for example, a chip system.

According to a second aspect, a reference signal receiving method is provided. The method includes: determining a second frequency band used to receive a reference signal; and receiving a part or all of the reference signal in the second frequency band, where the reference signal is generated based on at least one frequency reference point, and the at least one frequency reference point is determined based on the second frequency band.

The method may be performed by a second communications apparatus. The second communications apparatus may be a network device or a communications apparatus that can support a network device in implementing functions required in the method. Certainly, the second communications apparatus may alternatively be another communications apparatus, for example, a chip system.

The first frequency band may be a working bandwidth of the first communications apparatus, or may be a preconfigured or protocol-predefined frequency band used to send the reference signal. The second frequency band may be a working bandwidth of the second communications apparatus, or may be a preconfigured or protocol-predefined frequency band used to receive the reference signal. The working bandwidth may also be referred to as a carrier frequency band. The first frequency band and the second frequency band may be a same frequency band, or the first frequency band and the second frequency band may not completely overlap, but have an intersection.

In embodiments of this application, a frequency reference point is determined based on a frequency band. In this case, both the first communications apparatus that sends the reference signal and the second communications apparatus that receives the reference signal may determine frequency reference points based on frequency bands, and the frequency reference points determined by the two apparatuses are the same. In this case, the first communications apparatus and the second communications apparatus may determine a same reference signal at a same frequency domain location, so that the reference signal sent by the first communications apparatus can be correctly detected by the second communications apparatus. It can be learned that according to a new reference signal sending or receiving mechanism provided in the embodiments of this application, the reference signal sent by the first communications apparatus can be detected by the second communications apparatus, thereby implementing correct transmission of the reference signal between the two communications apparatuses.

In an embodiment, the determining at least one frequency reference point based on a first frequency band includes: determining the at least one frequency reference point based on a frequency interval in which the first frequency band is located, where the frequency interval is an interval obtained by dividing frequencies according to a predefined rule, and the at least one frequency reference point is predefined or configured for the frequency interval. Correspondingly, the at least one frequency reference point is determined based on a frequency interval in which the second frequency band is located, the frequency interval is an interval obtained by dividing frequencies according to a predefined rule, and the at least one frequency reference point is predefined or configured for the frequency interval.

The frequencies may be divided in advance according to the predefined rule to obtain at least one frequency interval, and one or more frequency reference points may be predefined for each of the at least one frequency interval. Therefore, after the frequency interval in which the first frequency band is located is determined, it may be determined that the at least one frequency reference point corresponding to the first frequency band is a frequency reference point corresponding to the frequency interval in which the first frequency band is located. This is the same for the second frequency band. In such a manner, a frequency reference point may be directly predefined, and implementation is relatively simple for a device. In addition, because a frequency interval is obtained through division in a predefined manner and a frequency reference point is predefined, for a device that sends a reference signal and a device that receives a reference signal, determined frequency reference points are the same. Therefore, the two devices generate a same reference signal at a same frequency domain location.

In an embodiment, the reference signal is determined based on one frequency reference point, and a frequency of the frequency reference point is the lowest frequency in the frequency interval, or a frequency that is less than the lowest frequency in the frequency interval.

For example, if the first frequency band is located in one frequency interval, and one frequency reference point is predefined for the frequency interval, the reference signal may be determined based on the frequency reference point corresponding to the frequency interval. In the embodiments of this application, a frequency of the frequency reference point corresponding to the frequency interval may be the lowest frequency in the frequency interval, or may be less than the lowest frequency in the frequency interval. The method is simple and intuitive, and it can be ensured, as much as possible, that all network devices in a communications system deployed in the frequency band can correctly determine a reference signal.

In an embodiment, the first frequency band is located in N frequency intervals, where N is an integer greater than or equal to 2. The at least one frequency reference point is one frequency reference point, and the frequency reference point corresponds to a frequency interval, in the N frequency intervals, in which the lowest frequency in the first frequency band is located. Correspondingly, the second frequency band is located in N frequency intervals, where N is an integer greater than or equal to 2. The at least one frequency reference point is one frequency reference point, and the frequency reference point corresponds to a frequency interval, in the N frequency intervals, in which the lowest frequency in the second frequency band is located.

If the first frequency band is located in at least two frequency intervals, one of the frequency intervals may be selected to determine the frequency reference point. To ensure, as much as possible, that all the network devices in the communications system deployed in the frequency band can correctly determine the reference signal, the frequency interval in which the lowest frequency in the first frequency band is located may be selected from the N frequency intervals, and the reference signal may be determined based on the frequency reference point corresponding to the frequency interval. This is the same for the second frequency band. For example, a frequency of the frequency reference point corresponding to the frequency interval is the lowest frequency in the frequency interval, or a frequency that is less than the lowest frequency in the frequency interval.

In an embodiment, the first frequency band is located in N frequency intervals, where N is an integer greater than or equal to 2. The at least one frequency reference point is N frequency reference points, and the N frequency reference points include a frequency reference point corresponding to each of the N frequency intervals. Correspondingly, the second frequency band is located in N frequency intervals, where N is an integer greater than or equal to 2. The at least one frequency reference point is N frequency reference points, and the N frequency reference points include a frequency reference point corresponding to each of the N frequency intervals.

If the first frequency band is located in at least two frequency intervals, a corresponding part of the reference signal may be determined based on each of the frequency intervals. In other words, the finally obtained reference signal is determined based on the frequency reference points corresponding to the N frequency intervals. If the first frequency band is located in at least two frequency intervals, whether the reference signal is determined based on the N frequency intervals or based on one of the N frequency intervals may be specified in a protocol, or may be determined through negotiation between network devices. This is not specifically limited. This is the same for the second frequency band, and determining manners used for the first frequency band and the second frequency band are the same.

In an embodiment, the determining at least one frequency reference point based on a first frequency band includes: determining the at least one frequency reference point configured for the first frequency band. Correspondingly, the foregoing at least one frequency reference point is configured for the second frequency band.

In an embodiment, a first network device may directly determine the at least one frequency reference point based on the first frequency band. For example, a frequency interval does not need to be obtained through division, and a frequency reference point may be predefined for a working bandwidth of at least one network device. For example, one or more frequency reference points may be predefined for a working bandwidth of each of the at least one network device, or one or more frequency reference points may not be predefined, but may be configured for a working bandwidth of each of the at least one network device in a signaling configuration manner. When one or more frequency reference points are predefined or configured for the frequency band, it may be considered that a same frequency reference point is configured for working bandwidths of network devices participating in measurement. Therefore, regardless of the first frequency band or the second frequency band, the frequency reference point may be directly determined. In this way, the network devices participating in measurement can generate a same reference signal at a same frequency domain location, to send and receive the reference signal. In the manner, the frequency interval does not need to be obtained through division, or the frequency reference point does not need to be determined based on a predefined frequency interval. This is relatively flexible.

In an embodiment, the reference signal is sent by the first network device to a second network device.

For example, the reference signal may be used for measurement between the two network devices, or may be used for another purpose.

According to a third aspect, a first communications apparatus is provided. The communications apparatus is, for example, a first network device. The communications apparatus has functions of implementing the first network device in the foregoing method designs. The functions may be implemented by hardware, or may be implemented by hardware executing corresponding software. The hardware or the software includes one or more units corresponding to the foregoing functions.

In an embodiment, a structure of the communications apparatus may include a processing module and a transceiver module. The processing module and the transceiver module may perform corresponding functions in the method provided in any one of the first aspect or the possible implementations of the first aspect.

According to a fourth aspect, a second communications apparatus is provided. The communications apparatus is, for example, a second network device. The communications apparatus has functions of implementing the second network device in the foregoing method designs. The functions may be implemented by hardware, or may be implemented by hardware executing corresponding software. The hardware or the software includes one or more units corresponding to the foregoing functions.

In an embodiment, a structure of the communications apparatus may include a processing module and a transceiver module. The processing module and the transceiver module may perform corresponding functions in the method provided in any one of the second aspect or the possible implementations of the second aspect.

According to a fifth aspect, a third communications apparatus is provided. The communications apparatus is, for example, a first network device. The communications apparatus has functions of implementing the first network device in the foregoing method designs. The functions may be implemented by hardware, or may be implemented by hardware executing corresponding software. The hardware or the software includes one or more units corresponding to the foregoing functions.

In an embodiment, a structure of the communications apparatus may include a processor and a transceiver. The processor and the transceiver may perform corresponding functions in the method provided in any one of the first aspect or the possible implementations of the first aspect. The transceiver is implemented as, for example, a communications interface. The communications interface herein may be understood as a radio frequency transceiver component in the network device.

According to a sixth aspect, a fourth communications apparatus is provided. The communications apparatus is, for example, a second network device. The communications apparatus has functions of implementing the second network device in the foregoing method designs. The functions may be implemented by hardware, or may be implemented by hardware executing corresponding software. The hardware or the software includes one or more units corresponding to the foregoing functions.

In an embodiment, a structure of the communications apparatus may include a processor and a transceiver. The processor and the transceiver may perform corresponding functions in the method provided in any one of the second aspect or the possible implementations of the second aspect. The transceiver is implemented as, for example, a communications interface. The communications interface herein may be understood as a radio frequency transceiver component in the network device.

According to a seventh aspect, a fifth communications apparatus is provided. The communications apparatus may be the first network device in the foregoing method designs, or may be a chip disposed in the first network device. The communications apparatus includes: a memory, configured to store computer-executable program code; and a processor. The processor is coupled to the memory. The program code stored in the memory includes an instruction. When the processor executes the instruction, the fifth communications apparatus is enabled to perform the method according to any one of the first aspect or the possible implementations of the first aspect.

The fifth communications apparatus may further include a communications interface. If the fifth communications apparatus is the first network device, the communications interface may be a transceiver in the first network device, for example, a radio frequency transceiver component in the first network device. Alternatively, if the fifth communications apparatus is the chip disposed in the first network device, the communications interface may be an input/output interface of the chip, for example, an input/output pin.

According to an eighth aspect, a sixth communications apparatus is provided. The communications apparatus may be the second network device in the foregoing method designs, or may be a chip disposed in the second network device. The communications apparatus includes: a memory, configured to store computer-executable program code; and a processor. The processor is coupled to the memory. The program code stored in the memory includes an instruction. When the processor executes the instruction, the sixth communications apparatus is enabled to perform the method according to any one of the second aspect or the possible implementations of the second aspect.

The sixth communications apparatus may further include a communications interface. If the sixth communications apparatus is the first network device, the communications interface may be a transceiver in the second network device, for example, a radio frequency transceiver component in the second network device. Alternatively, if the sixth communications apparatus is the chip disposed in the second network device, the communications interface may be an input/output interface of the chip, for example, an input/output pin.

According to a ninth aspect, a first communications system is provided. The communications system may include the first communications apparatus according to the third aspect and the second communications apparatus according to the fourth aspect.

According to a tenth aspect, a second communications system is provided. The communications system may include the third communications apparatus according to the fifth aspect and the fourth communications apparatus according to the sixth aspect.

According to an eleventh aspect, a third communications system is provided. The communications system may include the fifth communications apparatus according to the seventh aspect and the sixth communications apparatus according to the eighth aspect.

According to a twelfth aspect, a computer-readable storage medium is provided. The computer-readable storage medium stores an instruction. When the instruction is run on a computer, the computer is enabled to perform the method in any one of the first aspect or the possible designs of the first aspect.

According to a thirteenth aspect, a computer-readable storage medium is provided. The computer-readable storage medium stores an instruction. When the instruction is run on a computer, the computer is enabled to perform the method in any one of the second aspect or the possible designs of the second aspect.

According to a fourteenth aspect, a computer program product including an instruction is provided. The computer program product stores the instruction. When the instruction is run on a computer, the computer is enabled to perform the method in any one of the first aspect or the possible designs of the first aspect.

According to a fifteenth aspect, a computer program product including an instruction is provided. The computer program product stores the instruction. When the instruction is run on a computer, the computer is enabled to perform the method in any one of the second aspect or the possible designs of the second aspect.

According to the new reference signal sending or receiving mechanism provided in the embodiments of this application, the reference signal sent by the first communications apparatus can be detected by the second communications apparatus, thereby implementing correct transmission of the reference signal between the two communications apparatuses.

DESCRIPTION OF EMBODIMENTS

Figure 1:
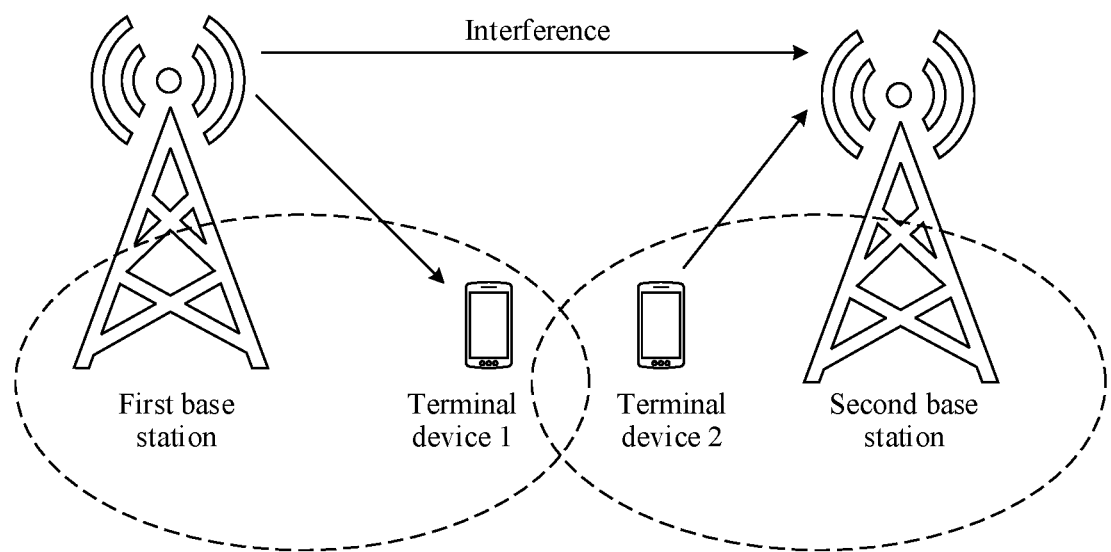
FIG. 1 is a schematic diagram of CLI between two base stations.

To make the objectives, the technical solutions, and advantages of embodiments of this application clearer, the following further describes the embodiments of this application in detail with reference to the accompanying drawings.

The following describes some terms in the embodiments of this application, to facilitate understanding by a person skilled in the art.

(1) A terminal device includes a device that provides a user with voice and/or data connectivity, for example, may include a handheld device having a wireless connection function, or a processing device connected to a wireless modem. The terminal device may communicate with a core network through a radio access network (RAN), and exchange a voice and/or data with the RAN. The terminal device may include UE, a wireless terminal device, a mobile terminal device, a subscriber unit, a subscriber station, a mobile station, mobile, a remote station (remote station), an access point AP), a remote terminal device, an access terminal device, a user terminal device, a user agent, a user apparatus, and the like. For example, the terminal device may include a mobile phone (which is also referred to as a "cellular" phone), a computer having a mobile terminal device, a portable, pocket-sized, handheld, computer built-in, or in-vehicle mobile apparatus, and a smart wearable device. For example, the terminal device may be a device such as a personal communications service (PCS) phone, a cordless telephone set, a session initiation protocol (SIP) phone, a wireless local loop (WLL) station, or a personal digital assistant (PDA). The terminal device further includes a limited device such as a device with relatively low power consumption, a device with a limited storage capability, or a device with a limited computing capability. For example, the terminal device may be an information sensing device such as a barcode, radio frequency identification (RFID), a sensor, a global positioning system (GPS), or a laser scanner.

By way of example, and not limitation, in the embodiments of this application, the terminal device may alternatively be a wearable device. The wearable device may also be referred to as a wearable intelligent device, and is a general term of wearable devices, such as glasses, gloves, watches, clothes, and shoes, that are developed by applying wearable technologies in intelligent designs of daily wear. The wearable device is a portable device that can be directly worn on a body or integrated into clothes or an accessory of a user. The wearable device is not only a hardware device, but is used to implement a powerful function through software support, a data exchange, and cloud interaction. In a broader sense, the wearable intelligent device is full-featured, has a large size, and can implement all or some functions without depending on a smartphone. For example, the wearable intelligent device is a smart watch or smart glasses. Alternatively, the wearable intelligent device focuses only on a specific application function and needs to be used with another device such as a smartphone. For example, the wearable intelligent device is a smart wristband, a smart helmet, or smart jewelry for physical sign monitoring.

(2) A network device, for example, including a base station (such as an access point), may be a device that is in an access network and that communicates with a wireless terminal device over an air interface in one or more cells. The network device may be configured to: mutually convert a received over-the-air frame and an internet protocol (IP) packet, and serve as a router between the terminal device and a rest portion of the access network, where the rest portion of the access network may include an IP network. The network device may further coordinate attribute management of the air interface. For example, the network device may include an evolved NodeB (NodeB, eNB, or e-NodeB) in an LTE system or in LTE-A, or may include a next generation NodeB (gNB) in an NR system in a fifth generation (5G) mobile communications technology, or may include a centralized unit (CU) and a distributed unit (DU) in a cloud access network (Cloud RAN) system. This is not limited in the embodiments of this application.

(3) The terms "system" and "network" may be used interchangeably in the embodiments of this application. "A plurality of" means two or more. In view of this, "a plurality of" may also be understood as "at least two" in the embodiments of this application. "At least one" may be understood as one or more, for example, understood as one, two, or more. For example, including at least one means including one, two, or more, and does not limit what are included. For example, including at least one of A, B, and C may represent the following cases: A is included, B is included, C is included, A and B are included, A and C are included, B and C are included, or A and B and C are included. Similarly, an understanding of descriptions such as "at least one type" is similar. The term "and/or" describes an association relationship between associated objects and represents that three relationships may exist. For example, A and/or B may represent the following three cases: Only A exists, both A and B exist, and only B exists. In addition, unless otherwise specified, the character "/" generally indicates an "or" relationship between the associated objects.

Unless otherwise stated, in the embodiments of this application, ordinal numbers such as "first" and "second" are used to distinguish between a plurality of objects, and not intended to limit an order, a time sequence, a priority, or importance of the plurality of objects.

The foregoing describes some concepts in the embodiments of this application. The following describes technical features in the embodiments of this application.

In a wireless communications system such as an NR system, an LTE system, or an LTE-A system, if a duplex mode of TDD is used in the system, CLI may be generated between base stations. For example, when a first base station sends a downlink signal, a second base station is receiving an uplink signal, and the downlink signal sent by the first base station usually has relatively high power and may be received by the second base station. Consequently, the second base station is interfered with in receiving the uplink signal. For example, referring to FIG. 1, a first cell and a second cell (which may be considered as a first base station in the first cell and a second base station in the second cell) in FIG. 1 work in a same frequency band. In the first cell, the first base station is sending a downlink signal to a terminal device 1, and in the second cell, the second base station is receiving an signal sent by a terminal device 2. The downlink signal sent by the first base station usually has relatively high power, and may also be received by the second base station. In this case, the second base station is interfered with in receiving the uplink signal sent by the terminal device 2. Consequently, the downlink signal in the first cell interferes in receiving of the uplink signal that is in the second cell.

Figure 2:
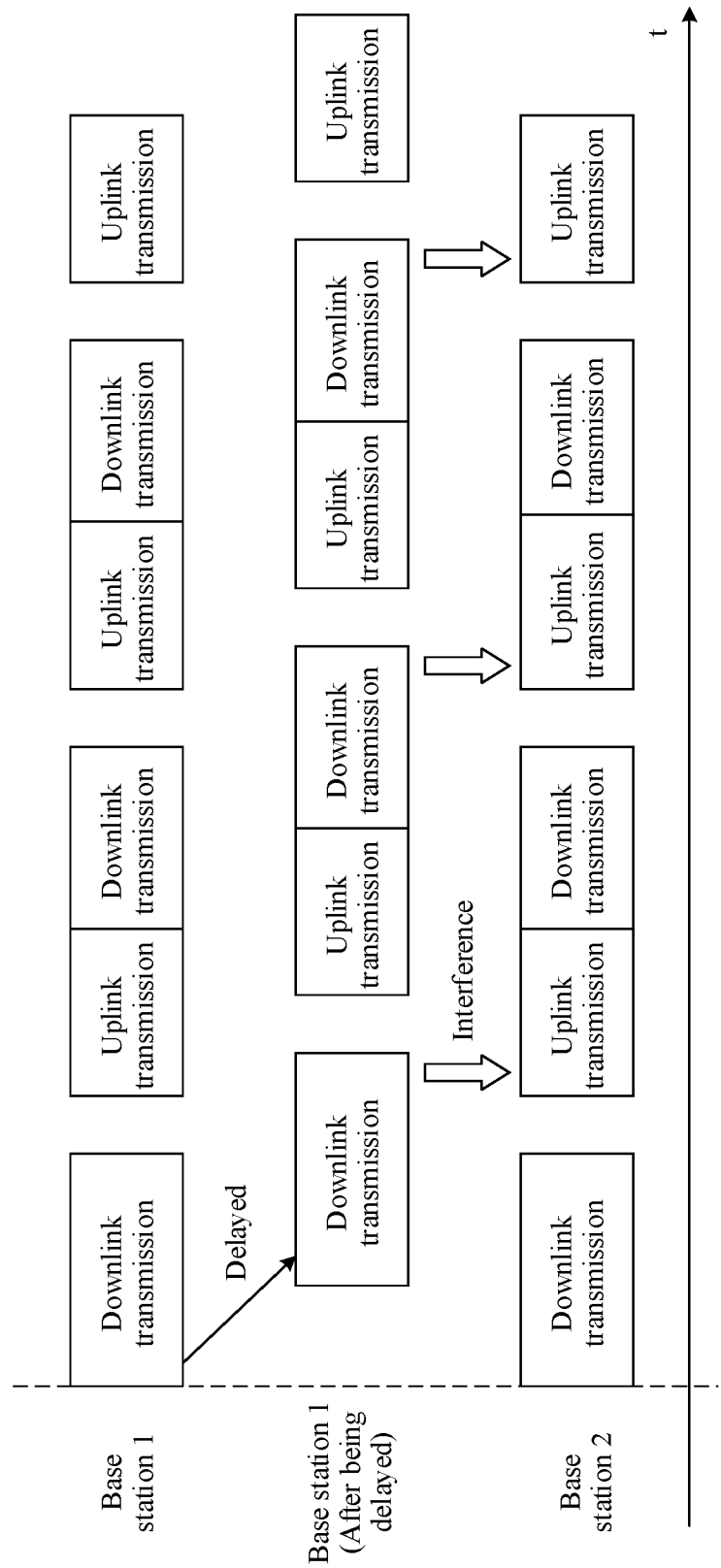
FIG. 2 is a schematic diagram of CLI between base stations that are relatively far away from each other.

The CLI between the base stations usually occurs when transmission directions in two TDD cells served by the base stations that work at a same frequency are different. Therefore, if the transmission directions in the TDD cells remain the same, the CLI is usually not generated. However, there is also an exception. For example, for two base stations that are geographically far away from each other, even if transmission directions of the two base stations are the same, to be specific, the two base stations simultaneously receive an uplink signal and send a downlink signal, because the two base stations are geographically far away from each other, a significant delay is generated when the downlink signal sent by one base station arrives at the other base station, and the other base station may have switched to an uplink receiving direction. In this case, the CLI is also generated between the two base stations. For example, referring to FIG. 2, transmission directions of a base station 1 and a base station 2 are originally the same. However, because of a relatively long distance, there is a delay when a downlink signal sent by the base station 1 arrives at the base station 2, and the base station 2 has started a receiving process of an uplink signal. In this case, the downlink signal sent by the base station 1 still interferes in receiving the uplink signal by the base station 2. The over-distance interference from a remote base station is usually caused by tropospheric bending. Whether interference between base stations is caused, an interference distance, a delay, and the like are affected by a geographical location and weather. Consequently, there is great uncertainty. In addition, a downlink signal sent by a base station on a distant hillside, or a base station on a distant lake or sea surface may also generate the over-distance interference.

To resist the over-distance interference, measurement between base stations may be considered, so that an interfering base station can be identified. However, in the NR system, currently, there is no standardized reference signal used for channel status measurement between NR base stations (for example, between gNBs), and there is also no related standardized measurement process.

Figure 3:
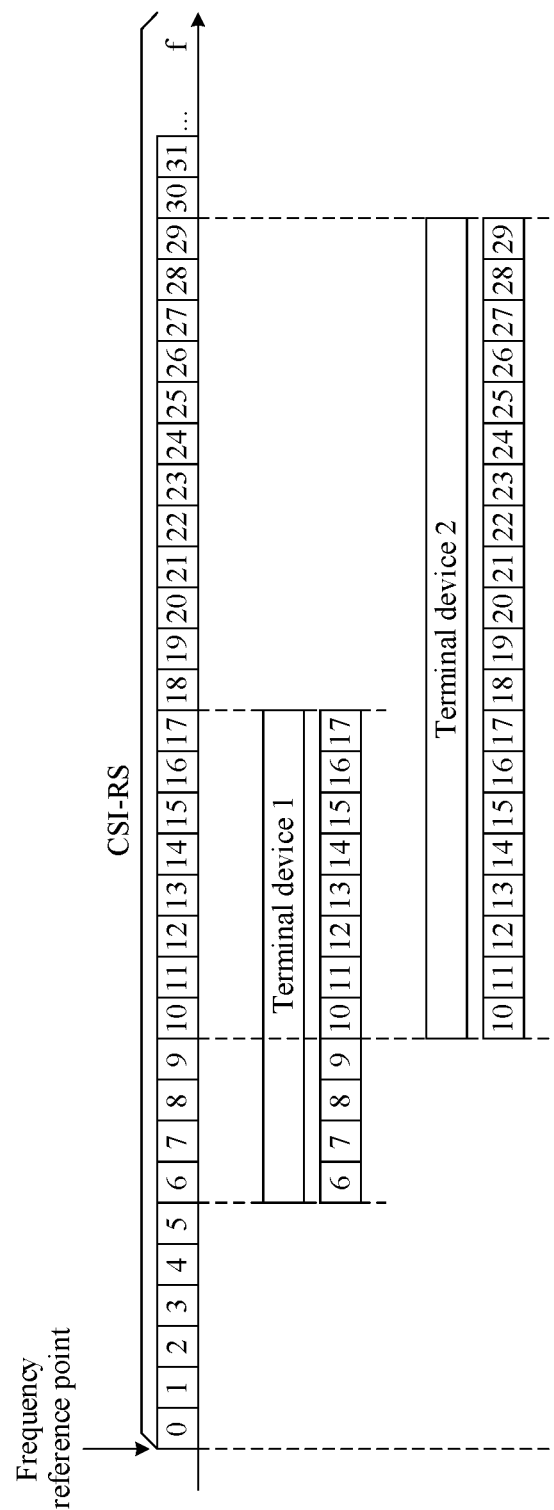
FIG. 3 is a schematic diagram of generating a CSI-RS.

In terms of a status of a channel between a gNB and a terminal device, in a downlink direction, the terminal device may measure a status of a downlink channel between the gNB and the terminal device by using a channel state information reference signal (CSI-RS). First, existing logic of generating a CSI-RS in frequency domain is briefly described. Referring to FIG. 3, in a cell, a reference point in frequency domain is indicated in a broadcast system message, and may be referred to as a frequency reference point. For example, the frequency reference point is a frequency reference point indicated in FIG. 3. The frequency reference point is common, and is valid for all terminal devices served by the cell. The CSI-RS may be generated according to a predefined formula, and is mapped in a specific order (for example, from a low frequency to a high frequency) based on a location of the frequency reference point. Both a terminal device and a base station can determine a CSI-RS carried on each subcarrier. The base station sends the CSI-RS at a corresponding location. The terminal device determines the CSI-RS received by the terminal device based on a bandwidth and a location for receiving/measuring the CSI-RS by the terminal device. As shown in FIG. 3, a base station sends a CSI-RS in a frequency band of the base station. A terminal device 1 determines that numbers related to the CSI-RS received in a frequency band in which the terminal device 1 receives/measures the CSI-RS are "6 to 17". A terminal device 2 determines that numbers related to the CSI-RS received in a frequency band in which the terminal device 2 receives/measures the CSI-RS are "10 to 29". A number in FIG. 3 may be considered as a number of a subcarrier, a number of a carrier, a number of an element included in a CSI-RS sequence, or the like.

In addition, generation of the CSI-RS may be specifically related to another factor such as a cell identity (ID) or a time domain location. However, this specification focuses only on impact of a frequency reference point. Therefore, content related to the another factor is not described in detail. For a specific cell whose cell ID is already fixed, on a specific orthogonal frequency division multiplexing (OFDM) symbol, a CSI-RS received by the terminal device is closely related to a location of the frequency reference point.

Therefore, first, although measurement between the base station and the terminal device can be supported in the prior art, measurement between base stations is not supported in the prior art.

Second, assuming that the measurement between the base stations can be performed, for example, channel measurement or signal detection between the base stations can be performed in a manner similar to the CSI-RS measurement manner between the base station and the terminal device, it is difficult to apply the CSI-RS measurement manner between the base station and the terminal device in the prior art to the measurement between the base stations. The reason is as follows: In the prior art, a common reference point in frequency domain is independently configured by each base station for communication between the base station and a terminal device served by the base station. That is, different base stations may configure different common reference points. Because the common reference points are different, two base stations determine different reference signals at a same frequency domain location. Consequently, a reference signal sent by one base station cannot be detected by the other base station, and, for example, to-be-completed subsequent work such as signal detection or channel measurement cannot be completed.

In view of this, the technical solutions in the embodiments of this application are provided. In the embodiments of this application, a first communications apparatus and a second communications apparatus may determine a same reference signal at a same frequency domain location, so that a reference signal sent by the first communications apparatus can be correctly detected by the second communications apparatus. It can be learned that according to a new reference signal sending or receiving mechanism provided in the embodiments of this application, the reference signal sent by the first communications apparatus can be detected by the second communications apparatus, thereby implementing transmission of the reference signal between the two communications apparatuses.

The embodiments of this application may be used in a 5G NR system, or may be used in another communications system such as an LTE system. The technical solutions provided in the embodiments of this application can be used provided that one entity in the communications system needs to send a signal and another entity needs to receive or measure a signal.

Figure 4:
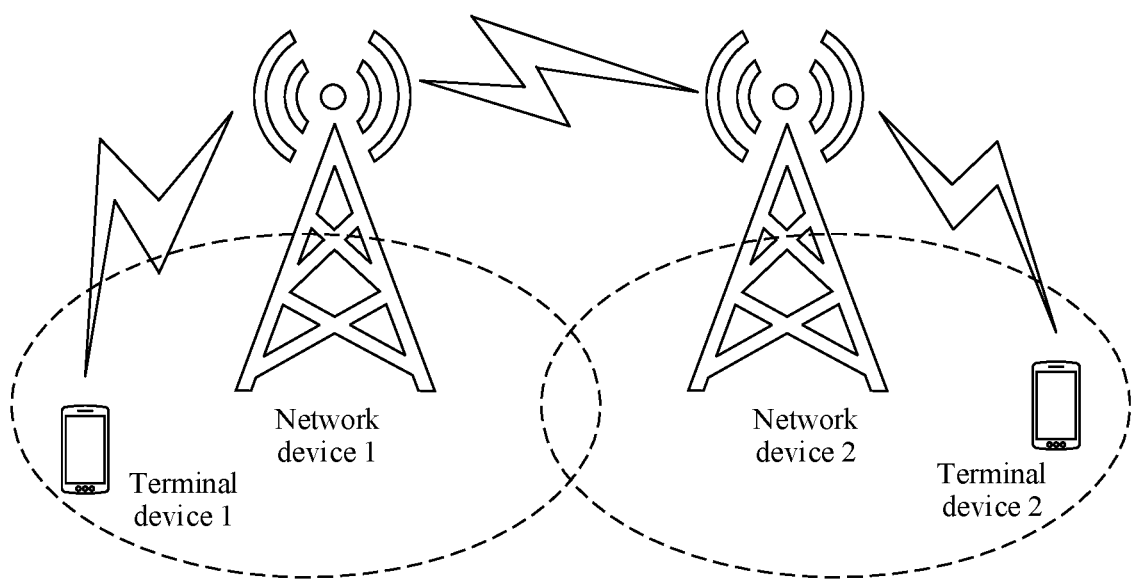
FIG. 4 is a schematic diagram of a network architecture used for an embodiment of this application.

The foregoing describes a current problem, and describes a communications system in which the embodiments of this application may be used. Referring to FIG. 4, the following describes an application scenario of the embodiments of this application, or a network architecture used for the embodiments of this application.

FIG. 4 includes a network device 1 and a network device 2. The network device 1 serves a terminal device 1, and the network device 2 serves a terminal device 2. The network device 1 and the network device 2 may be two network devices that are geographically far away from each other, and measurement needs to be performed between the network device 1 and the network device 2. In addition, there may be another network device and another terminal device. This is not limited in the embodiments of this application. In addition, the embodiments of this application may also be used for measurement between adjacent network devices. Therefore, the network device 1 and the network device 2 may alternatively be two geographically adjacent network devices.

A network device in FIG. 4 is, for example, an access network (access network, AN) device such as a base station.

The following describes the technical solutions provided in the embodiments of this application with reference to the accompanying drawings.

Figure 5:
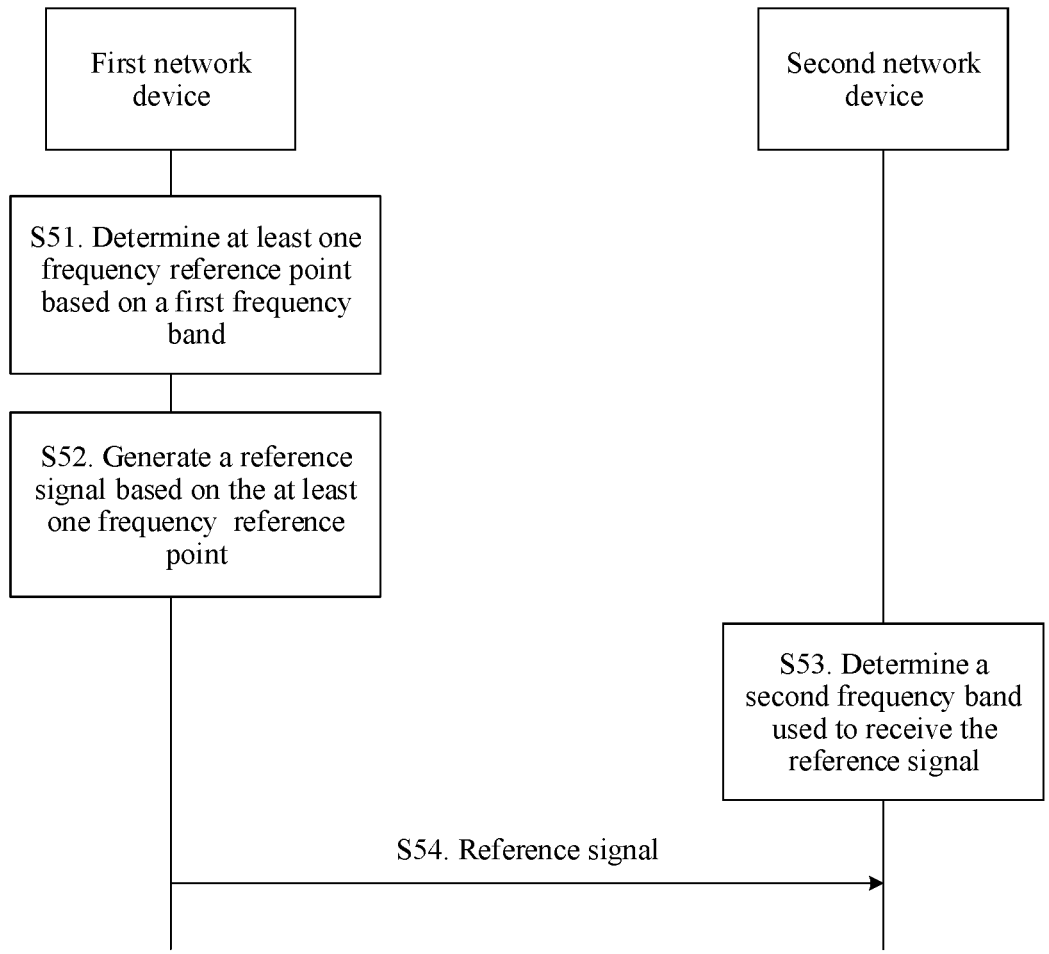
FIG. 5 is a flowchart of a reference signal sending and receiving method according to an embodiment of this application.

An embodiment of this application provides a reference signal sending and receiving method. FIG. 5 is a flowchart of the method. In the following description process, an example in which the method is used in the network architecture shown in FIG. 4 is used. In addition, the method may be performed by two communications apparatuses. The two communications apparatuses are, for example, a first communications apparatus and a second communications apparatus. The first communications apparatus may be a network device or a communications apparatus that can support a network device in implementing functions required in the method. Certainly, the first communications apparatus may alternatively be another communications apparatus, for example, a chip system. This is the same for the second communications apparatus. The second communications apparatus may be a network device or a communications apparatus that can support a network device in implementing functions required in the method. Certainly, the second communications apparatus may alternatively be another communications apparatus, for example, a chip system. In addition, implementations of the first communications apparatus and the second communications apparatus are not limited. For example, both the first communications apparatus and the second communications apparatus are network devices, or the first communications apparatus is the network device, and the second communications apparatus is the communications apparatus that can support the network device in implementing the functions required in the method. For example, the network device is a base station.

For ease of description, the following uses an example in which the method is performed by the network devices, to be specific, an example in which the first communications apparatus is a first network device and the second communications apparatus is a second network device. For example, the first network device is the network device 1 in the network architecture shown in FIG. 4, and the second network device is the network device 2 in the network architecture shown in FIG. 4. Alternatively, the first network device is the network device 2 in the network architecture shown in FIG. 4, and the second network device is the network device 1 in the network architecture shown in FIG. 4.

S51. The first network device determines at least one frequency reference point based on a first frequency band.

The first frequency band is, for example, a working band of the first network device. The working frequency band may also be referred to as a carrier frequency band, or may be a preconfigured or protocol-predefined frequency band used to send a reference signal. This is not specifically limited. If the first network device determines to send the reference signal in the first frequency band, the first network device may first determine the at least one frequency reference point based on the first frequency band.

In an embodiment of this application, that the first network device determines the at least one frequency reference point based on the first frequency band may specifically include: The first network device determines the at least one frequency reference point based on a frequency interval in which the first frequency band is located. Frequencies may be divided in advance according to a predefined rule to obtain at least one frequency interval, and one or more frequency reference points may be predefined for each of the at least one frequency interval. Therefore, after the frequency interval in which the first frequency band is located is determined, it may be determined that the at least one frequency reference point corresponding to the first frequency band is a frequency reference point corresponding to the frequency interval in which the first frequency band is located.

In an implementation of obtaining a frequency interval, a method for obtaining a frequency interval through division may be provided in the 3rd generation partnership project (3GPP). In other words, the frequency interval may include a frequency band that is defined in a 3GPP standard and that can be deployed in a 5G communications system. A manner in which a frequency band is defined in the 3GPP standard for an NR system is shown in Table 1.

N/A in Table 1 indicates that the parameter is not set. In Table 1, the NR operating band in the first column represents a sequence number, or is understood as an identifier of a frequency band. For example, the frequency band n1 corresponds to an uplink bandwidth of 1920 MHz to 1980 MHz and a downlink bandwidth of 2110 MHz to 2170 MHz, and a duplex mode that may be used in a communications system deployed in the frequency band n1 is the FDD mode. Alternatively, the frequency band n38 is used as an example. A duplex mode in the frequency band n38 is the TDD mode, a corresponding uplink frequency range is 2570 MHz to 2620 MHz, and a corresponding downlink frequency range is 2570 MHz to 2620 MHz. Frequency ranges of uplink and downlink frequency bands are usually the same in the TDD mode, and duplexing of sending and receiving is implemented in a time division manner. Frequency ranges of uplink and downlink frequency bands are usually different in the FDD mode, and duplexing of sending and receiving is implemented in a frequency division manner.

In this case, one row in Table 1 represents one frequency interval. For example, n1 represents one frequency interval, n2 represents another frequency interval, and so on. It may be understood that a plurality of frequency intervals are obtained by dividing frequencies according to a predefined rule.

In an embodiment of this application, for each frequency interval in Table 1, a frequency reference point may be predefined. In this specification, an example in which one frequency reference point is predefined for each frequency interval is mainly used, and a quantity of frequency reference points predefined for one frequency interval is not actually limited. For example, for frequency reference points respectively predefined for the frequency band n38, the frequency band n41, the frequency band n50, and the frequency band n51 in Table 1, refer to Table 2.

TABLE 1

| NR operating band (operating band) | Uplink operating band Base station receive/ UE transmit $F_{UL\_low}$ to $F_{UL\_high}$ | Downlink operating band Base station transmit/ UE receive $F_{DL\_low}$ to $F_{DL\_high}$ | Duplex mode |
|---|---|---|---|
| n1 | 1920 MHz to 1980 MHz | 2110 MHz to 2170 MHz | Frequency division duplex (FDD) |
| n2 | 1850 MHz to 1910 MHz | 1930 MHz to 1990 MHz | FDD |
| n3 | 1710 MHz to 1785 MHz | 1805 MHz to 1880 MHz | FDD |
| n5 | 824 MHz to 849 MHz | 869 MHz to 894 MHz | FDD |
| n7 | 2500 MHz to 2570 MHz | 2620 MHz to 2690 MHz | FDD |
| n8 | 880 MHz to 915 MHz | 925 MHz to 960 MHz | FDD |
| n20 | 832 MHz to 862 MHz | 791 MHz to 821 MHz | FDD |
| n28 | 703 MHz to 748 MHz | 758 MHz to 803 MHz | FDD |
| n38 | 2570 MHz to 2620 MHz | 2570 MHz to 2620 MHz | Time division duplex (TDD) |
| n41 | 2496 MHz to 2690 MHz | 2496 MHz to 2690 MHz | TDD |
| n50 | 1432 MHz to 1517 MHz | 1432 MHz to 1517 MHz | TDD |
| n51 | 1427 MHz to 1432 MHz | 1427 MHz to 1432 MHz | TDD |
| n66 | 1710 MHz to 1780 MHz | 2110 MHz to 2200 MHz | FDD |
| n70 | 1695 MHz to 1710 MHz | 1995 MHz to 2020 MHz | FDD |
| n71 | 663 MHz to 698 MHz | 617 MHz to 652 MHz | FDD |
| n74 | 1427 MHz to 1470 MHz | 1475 MHz to 1518 MHz | FDD |
| n75 | N/A | 1432 MHz to 1517 MHz | Supplementary downlink (SDL) |
| n76 | N/A | 1427 MHz to 1432 MHz | SDL |
| n77 | 3300 MHz to 4200 MHz | 3300 MHz to 4200 MHz | TDD |
| n78 | 3300 MHz to 3800 MHz | 3300 MHz to 3800 MHz | TDD |
| n79 | 4400 MHz to 5000 MHz | 4400 MHz to 5000 MHz | TDD |
| n80 | 1710 MHz to 1785 MHz | N/A | Supplementary uplink (SUL) |
| n81 | 880 MHz to 915 MHz | N/A | SUL |
| n82 | 832 MHz to 862 MHz | N/A | SUL |
| n83 | 703 MHz to 748 MHz | N/A | SUL |
| n84 | 1920 MHz to 1980 MHz | N/A | SUL |

TABLE 2

| NR operating band | Uplink (UL) operating band BS receive/UE transmit $F_{UL\_low}$ to $F_{UL\_high}$ | Downlink (DL) operating band BS transmit/UE receive $F_{DL\_low}$ to $F_{DL\_high}$ | Duplex Mode | Reference point |
|---|---|---|---|---|
| n38 | 2570 MHz to 2620 MHz | 2570 MHz to 2620 MHz | TDD | 2570 MHz |
| n41 | 2496 MHz to 2690 MHz | 2496 MHz to 2690 MHz | TDD | 2496 MHz |
| n50 | 1432 MHz to 1517 MHz | 1432 MHz to 1517 MHz | TDD | 1432 MHz |
| n51 | 1427 MHz to 1432 MHz | 1427 MHz to 1432 MHz | TDD | 1427 MHz |

The reference point, namely, a frequency reference point, in the last column in Table 2 is the frequency reference point set for the corresponding frequency interval. For example, for the frequency band n38, it can be learned according to Table 2 that a frequency of the frequency reference point set for the frequency band n38 is 2570 MHz. In Table 2, only some frequency intervals are selected as examples. In actual application, one or more frequency reference points may be predefined for each frequency interval in Table 1. Alternatively, optionally, a frequency reference point may be set only for a frequency interval in which a duplex mode is the TDD mode, and no frequency reference point may be set for a frequency interval in which a duplex mode is the FDD mode, the SUL mode, or the SDL mode. This is because usually, intra-frequency CLI is generated only in a communications system in the TDD mode. For a communications system in the FDD mode, because downlink transmission and uplink transmission are performed in different frequency bands, the intra-frequency CLI is usually not generated. The frequency reference point is set only for the frequency interval in which the duplex mode is the TDD mode, so that a quantity of specified frequency reference points can be reduced.

In a first implementation of obtaining a frequency interval, an example in which one row in Table 1 is considered as one frequency interval is used. In a second implementation of obtaining a frequency interval, one row in Table 1 may be further divided to obtain the at least one frequency interval in this embodiment of this application. In other words, one frequency band in Table 1 may be further divided to obtain one or more frequency intervals. When the frequency reference point is set, the one or more frequency reference points may still be set for one frequency interval. A range included in the frequency interval is not limited in this embodiment of this application.

In a third implementation of obtaining a frequency interval, Table 1 may not be used. To be specific, frequency bands divided according to the 3GPP standard are not used. The frequency interval is obtained through division in another manner. For example, a frequency interval may be obtained through division every 100 MHz. In this case, it may be considered that one frequency interval corresponds to two frequency reference points. To be specific, the lowest frequency and the highest frequency in the frequency interval are frequencies of the two frequency reference points corresponding to the frequency interval. Alternatively, it may be considered that one frequency interval corresponds to one frequency reference point. For example, it may be specified that the lowest frequency corresponding to each frequency interval is a frequency of the frequency reference point corresponding to the frequency interval, or it is specified that the highest frequency corresponding to each frequency interval is a frequency of the frequency reference point corresponding to the frequency interval. For example, an example is shown in Table 3:

TABLE 3

| Frequency interval | Frequency reference point |
|---|---|
| 2500 MHz ≤ f <2600 MHz | 2500 MHz |
| 2600 MHz ≤ f <2700 MHz | 2600 MHz |
| 2700 MHz ≤ f <2800 MHz | 2700 MHz |

One row in Table 3 represents one frequency interval, and the frequency reference point is a frequency reference point corresponding to the corresponding frequency interval. As shown in Table 3, if a network device works in a range of 2500 MHz to 2600 MHz, to be specific, a working bandwidth of the network device is within a frequency interval of 2500 MHz to 2600 MHz, the network device may determine that the frequency reference point is 2500 MHz. Alternatively, if a network device works in a range of 2600 MHz to 2700 MHz, to be specific, a working bandwidth of the network device is within a frequency interval of 2600 MHz to 2700 MHz, the network device may determine that the frequency reference point is 2600 MHz.

Optionally, if the solution provided in this embodiment of this application is applied to the NR system, when the frequency interval is obtained through division, a frequency range (which is also referred to as a frequency spacing) of one frequency interval obtained through division may be different based on different frequency locations. In this way, this solution can adapt to a deployment bandwidth of the NR system. A working frequency band of the NR system does not always include even frequencies. A higher frequency indicates a larger frequency band that can be deployed. For example, in a frequency range below 6 GHz, a range of a working frequency band of a cell usually does not exceed 100 MHz, while in a frequency range above 6 GHz, the range of the working frequency band of the cell may reach 400 MHz. Different frequency spacings are defined at different frequency locations, so that a granularity of a frequency reference point is not excessively large or small, a possibility that a working bandwidth of a network device crosses two or more frequency intervals can be reduced as much as possible, and complexity of sending/detecting the reference signal is reduced. In addition, for a network device working at a low frequency, if a frequency interval is obtained through division based on a relatively large frequency spacing, although an actual working bandwidth of such a network device is not high, because the frequency interval is relatively large, an excessively long and to-be-sent or to-be-detected reference signal needs to be stored. Consequently, the complexity of sending/detecting the reference signal by the network device is increased. This can be avoided as much as possible according to the solution provided in this embodiment of this application.

For example, frequencies may be first divided into at least two parts, and each part may be further divided to obtain at least one frequency interval. For different parts of the at least two parts, a frequency range of one frequency interval may be different. For example, the frequencies are divided into three parts: a first part, a second part, and a third part. A frequency range of a frequency interval in the first part is referred to as a first frequency spacing, a frequency range of a frequency interval in the second part is referred to as a second frequency spacing, and a frequency range of a frequency interval in the third part is referred to as a third frequency spacing. The first frequency spacing, the second frequency spacing, and the third frequency spacing are all different. For example, when the frequency spacings are set, refer to a principle: A lower frequency indicates a smaller specified frequency spacing, and a higher frequency indicates a larger specified frequency spacing.

For example, the frequencies are divided into three parts. The first part includes a frequency less than 3 GHz, the second part includes a frequency greater than or equal to 3 GHz, and less than 6 GHz, and the third part includes a frequency greater than or equal to 6 GHz. The first part may be considered as a low frequency part. For example, a range of the specified frequency spacing may be [5 MHz, 100 MHz]. For example, the frequency spacing is set to 100 MHz. To be specific, a frequency interval and a corresponding frequency reference point may be set every 100 MHz. The second part may be considered as a medium frequency part. For example, a range of the specified frequency spacing may be [100 MHz, 400 MHz]. For example, the frequency spacing is set to 200 MHz. To be specific, a frequency interval and a frequency reference point may be set every 200 MHz. The third part may be considered as a high frequency part. For example, the specified frequency spacing may be 1 GHz. To be specific, a frequency interval and a frequency reference point may be set every 1 GHz. For this, refer to Table 4:

TABLE 4

| Frequency range | Frequency spacing | Frequency reference point |
| --- | --- | --- |
| f < 3 GHz | 100 MHz | $\lfloor \frac{f}{100\ M} \rfloor * 100$ MHz |
| 3 GHz ≤ f < 6 GHz | 200 MHz | $\lfloor \frac{f}{200\ M} \rfloor * 200$ MHz |
| 6 GHz ≤ f | 1 GHz | $\lfloor \frac{f}{1\ G} \rfloor * 1$ GHz |

In Table 4, the frequency range represents different parts obtained by dividing the frequencies. For example, f<3 GHz represents the first part, 3 GHz≤f<6 GHz represents the second part, and 6 GHz≤f represents the third part. $\lfloor X \rfloor$ in Table 4 indicates that X is rounded down.

In Table 4, it is equivalent to that the lowest frequency in each frequency interval is set as a frequency reference point of the frequency interval. That is, Table 4 may be equivalent to Table 5:

TABLE 5

| Frequency range | Frequency interval | Frequency reference point |
| --- | --- | --- |
| f <3 GHz | 0 MHz ≤ f <100 MHz | 0 MHz |
| | 100 MHz ≤ f <200 MHz | 100 MHz |
| | . . . | . . . |
| 3 GHz ≤ f <6 GHz | 3000 MHz ≤ f <3200 MHz | 3000 MHz |
| | 3200 MHz ≤ f <3400 MHz | 3200 MHz |
| | . . . | . . . |

TABLE 5-continued

| Frequency range | Frequency interval | Frequency reference point |
| --- | --- | --- |
| 6 GHz ≤ f | 6 GHz ≤ f <7 GHz | 6 GHz |
| | 7 GHz ≤ f <8 GHz | 7 GHz |
| | . . . | . . . |

In Table 5, the first column indicates the three parts of the frequencies, the second column indicates frequency intervals obtained by further dividing the three parts of the frequencies, and the third column indicates frequency reference points corresponding to the frequency intervals.

The foregoing describes how to obtain the frequency interval, and the following describes how to set a frequency reference point for the frequency interval.

In an embodiment, an example in which one frequency reference point is set for one frequency interval is still used. In this case, a frequency of the frequency reference point corresponding to the frequency interval may be the lowest frequency (for example, as shown in Table 5) in the frequency interval, or a frequency of the frequency reference point corresponding to the frequency interval may be less than the lowest frequency in the frequency interval. The rule may be used for each frequency interval, or may be used for a part of frequency intervals. This is not specifically limited.

Figure 6A:
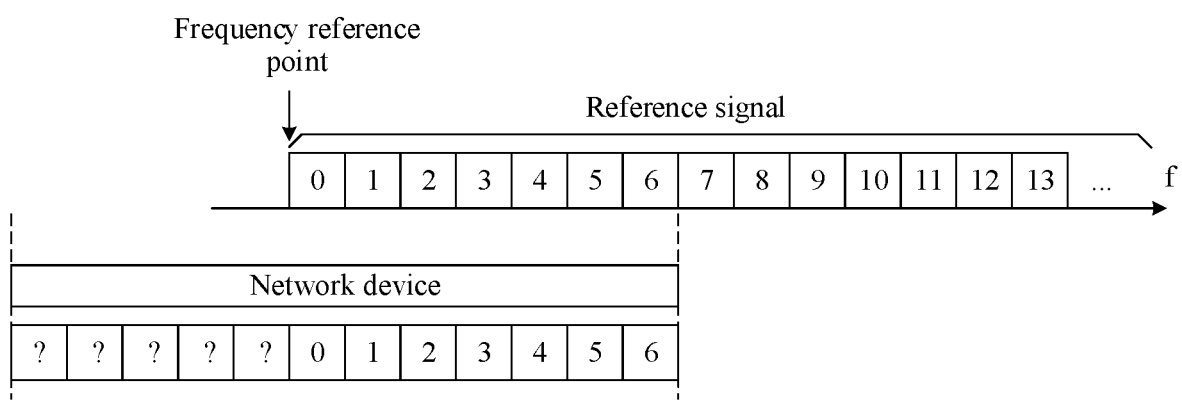
FIG. 6A is a schematic diagram of an assumed manner of setting a frequency reference point according to an embodiment of this application.

For example, a working bandwidth of a network device is in a frequency interval 1, a frequency reference point corresponding to the frequency interval 1 is, for example, a frequency reference point 1, and a frequency of the frequency reference point 1 is greater than the lowest frequency in the frequency interval 1. In this case, for example, if the working bandwidth of the network device further includes a frequency that is lower than the frequency of the frequency reference point 1, a reference signal cannot be defined in a part of bandwidths that is from the lowest frequency of the working bandwidth of the network device to the frequency reference point 1. Consequently, the network device cannot send the reference signal in the part of bandwidths. Alternatively, if the network device is used as a receive end, the network device cannot receive the reference signal in the part of bandwidths either. Consequently, detection performance is reduced. For this, refer to FIG. 6A. It can be learned from FIG. 6A that the working bandwidth of the network device is shown in the second row, and the working bandwidth of the network device includes the frequency that is lower than a frequency of a frequency reference point corresponding to a frequency interval in which the working bandwidth is located. In this case, a part shown by a question mark (?) in FIG. 6A is a part that cannot be defined based on the frequency reference point. Because of existence of the part, the detection performance is reduced, and resources of the part are also wasted.

To resolve the problem, in an embodiment of this application, the frequency of the frequency reference point corresponding to the frequency interval may be the lowest frequency in the frequency interval, or may be less than the lowest frequency in the frequency interval. The method is simple and intuitive, and it can be ensured, as much as possible, that all network devices in a communications system deployed in the frequency band can correctly determine a reference signal. For example, referring to FIG. 6B, it can be learned from FIG. 6B that the working bandwidth of the network device does not include the frequency that is lower than the frequency of the frequency reference point corresponding to the frequency interval in which the working bandwidth is located. Therefore, a location of the reference signal may be determined in an entire range of the working bandwidth of the network device based on the frequency reference point, so that the reference signal can be sent or detected, thereby improving the detection performance.

In the solution described above, the at least one frequency interval is obtained through division in advance, and a frequency reference point is predefined for each frequency interval. Therefore, the first network device may determine the at least one frequency reference point based on the frequency interval in which the first frequency band is located. This may be used as an ambodiment of determining the frequency reference point. In another embodiment, the first network device may directly determine the at least one frequency reference point based on the first frequency band. For example, the frequency interval does not need to be obtained through division, and a frequency reference point may be predefined for a working frequency band of at least one network device. For example, one or more frequency reference points may be predefined for a working frequency band of each of the at least one network device, or one or more frequency reference points may not be predefined, but may be configured for a working frequency band of each of the at least one network device in a signaling configuration manner. When the frequency reference points are predefined or configured for the frequency band, it may be considered that a same frequency reference point is configured for working frequency bands of network devices (including a network device sending a reference signal and a network device receiving a reference signal) participating in measurement. Therefore, the network devices participating in measurement can have a same understanding of the reference signal. If this manner is used, the first network device may directly determine, based on the first frequency band in which the first network device works, the at least one frequency reference point predefined or configured for the first frequency band. In the manner, the frequency interval does not need to be obtained through division, or the frequency reference point does not need to be determined based on the predefined frequency interval. This is relatively flexible.

Regardless of whether the frequency reference point is determined based on the frequency interval or the frequency reference point is directly determined based on the frequency band without using the frequency interval, the first network device and the second network device may determine a same reference signal at a same frequency domain location, so that the reference signal sent by the first network device can be correctly detected by the second network device through blind detection. It can be learned that according to a new reference signal sending or receiving mechanism provided in this embodiment of this application, the reference signal sent by the first network device can be detected by the second network device, thereby implementing transmission of the reference signal between the two network devices. For example, measurement, channel estimation, or the like that is to be performed between the first network device and the second network device can also be implemented because the reference signal can be correctly transmitted.

Figure 6B:
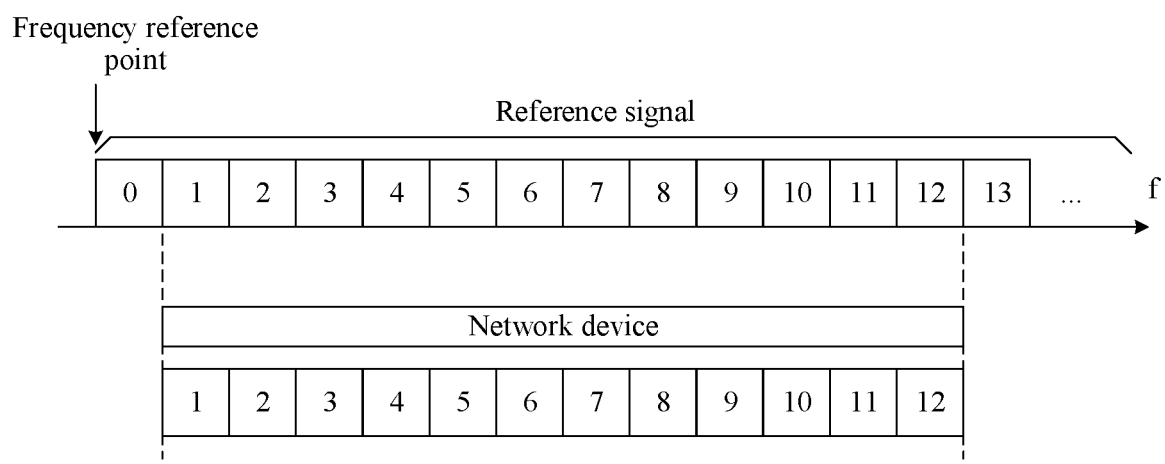
FIG. 6B is a schematic diagram of a manner of setting a frequency reference point according to an embodiment of this application.

A number in FIG. 6A and FIG. 6B may be considered as a number of a subcarrier, a number of a carrier, a number of an element included in a reference signal sequence, or the like.

S52. The first network device generates the reference signal based on the at least one frequency reference point.

In an embodiment of this application, a working bandwidth of the first network device may be located in one frequency interval, or may cross two or more frequency intervals. If the working bandwidth of the first network device is located in one frequency interval, the first network device may directly determine a frequency reference point corresponding to the frequency interval, and generate the reference signal based on the frequency reference point corresponding to the frequency interval. For example, FIG. 6B is an example of the reference signal generated by the network device. In FIG. 6B, numbers related to the generated reference signal are 1 to 12.

If the working bandwidth of the first network device crosses two or more frequency intervals, the network device needs to determine how to generate the reference signal. For example, the first network device determines that the first frequency band is located in N frequency intervals, where N is an integer greater than or equal to 2. For example, each frequency interval corresponds to one frequency reference point, and the N frequency intervals correspond to N frequency reference points. In this case, in an implementation of selecting a frequency reference point, the first network device may determine a frequency interval, which, for example, is referred to as a first frequency interval, in which the lowest frequency in the first frequency band in the N frequency intervals is located. In this case, a quantity of the at least one frequency reference point determined by the first network device is 1. That is, the first network device determines only one frequency reference point. The frequency reference point corresponds to the first frequency interval, and the first network device determines the to-be-sent reference signal based on the frequency reference point. In this manner, a quantity of determined frequency reference points can be reduced, and complexity of generating the reference signal can be reduced to some extent. Certainly, an example in which one frequency interval corresponds to one frequency reference point is used herein. If one frequency domain interval corresponds to a plurality of frequency reference points, a quantity of the at least one frequency reference point determined by the first network device may be greater than 1. Alternatively, if one frequency interval corresponds to a plurality of frequency reference points, the first network device may select one frequency reference point from the plurality of frequency reference points corresponding to the first frequency interval as the determined frequency reference point.

Alternatively, in another embodiment of selecting a frequency reference point, the first network device determines N frequency intervals in which the first frequency band is located, where N is an integer greater than or equal to 2. For example, each frequency interval corresponds to one frequency reference point, and the N frequency intervals correspond to N frequency reference points. In this way, the first network device may determine the frequency reference points corresponding to the N frequency intervals. In this embodiment, a quantity of the at least one frequency reference point determined by the first network device is N. That is, N frequency reference points are determined in total. The N frequency reference points include the frequency reference point corresponding to each of the N frequency intervals. Certainly, an example in which one frequency interval corresponds to one frequency reference point is used herein. If one frequency interval corresponds to a plurality of frequency reference points, a quantity of the at least one frequency reference point determined by the first network device is greater than N.

Figure 7:
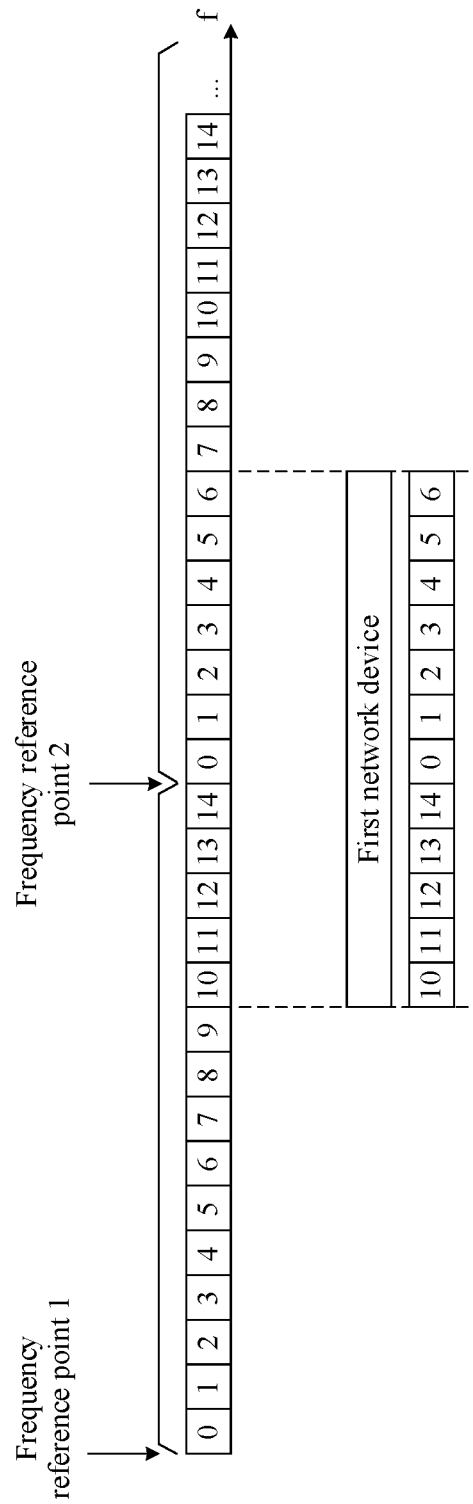
FIG. 7 is a schematic diagram of generating a reference signal across frequency intervals according to an embodiment of this application.

Referring to FIG. 7, the frequency intervals shown in Table 3 are used as an example. For example, the first network device works in 2680 MHz to 2730 MHz, and crosses the second frequency interval shown in the second row and the third frequency interval shown in the third row that are shown in Table 3. The first network device may determine two frequency reference points: a frequency reference point (which is represented as a frequency reference point 1 in FIG. 7) corresponding to the second frequency interval, and a frequency reference point (which is represented as a frequency reference point 2 in FIG. 7) corresponding to the third frequency interval in Table 3. In this case, the first network device may generate the reference signal based on the two frequency reference points, and determine the reference signal by using frequency reference points corresponding to parts belonging to different frequency intervals. As shown in FIG. 7, in the reference signal generated by the first network device, parts 10 to 14 are generated based on the frequency reference point 1, and parts 0 to 6 are generated based on the frequency reference point 2. A number in FIG. 7 may be considered as a number of a subcarrier, a number of a carrier, a number of an element included in a reference signal sequence, or the like.

If the working bandwidth of the first network device crosses two or more frequency intervals, an implementation to be used by the first network device to select the frequency reference points may be predefined in a protocol, preconfigured via a control node at a higher layer, or the like. This is not specifically limited.

In an embodiment of this application, a frequency reference point of each frequency interval is predefined, so that signaling exchange is not required between network devices, and configuration of the control node at a higher layer is not required, thereby reducing signaling overheads. The network device may determine the frequency reference point based on the frequency interval in which the working bandwidth of the network device is located, so that the network device that sends the reference signal and the network device that receives the reference signal can generate a same reference signal at a same frequency domain location. This may be understood as: The network device that sends the reference signal and the network device that receives the reference signal have a same "understanding" of the reference signal. Therefore, the two network devices may further send or receive a reference signal used for measurement between the network devices, and the network device that receives the reference signal can correctly detect the reference signal, to implement the measurement between the network devices. In addition, usually, because information cannot be exchanged between network devices of different operators, signaling exchange or unified control cannot be performed. However, according to the method for predefining a frequency reference point provided in this embodiment of this application, the signaling exchange does not need to be performed between the network devices. Therefore, network devices of different operators may also measure each other, so that an application scope of the embodiments of this application is extended, and measurement between the network devices of different operators is also implemented.

In the foregoing description, the frequency reference point is determined based on the frequency interval; to be specific, the frequencies are first divided into the at least one frequency interval, and the frequency reference points are predefined for each frequency interval. Alternatively, the frequency reference point is determined based on the first frequency band; to be specific, the one or more frequency reference points are predefined or configured for the working frequency band of the network device. These are only two implementations of setting a frequency reference point. In a third implementation of setting a frequency reference point, the frequency reference point may not need to be predefined, but may be configurable, or may be determined through a combination of predefinition and configuration. For example, a plurality of frequency reference points may be predefined for one frequency interval, and a network device that works in the frequency interval is enabled, in a signaling configuration manner, to use one of the plurality of frequency reference points. Alternatively, a frequency of any frequency reference point may be configured for a network device that works in a frequency interval, to maximize configuration flexibility.

Predefinition may be understood as that a device may directly determine predefined content without a signaling notification. Configuration may be understood as that a device can determine configured content only after receiving a signaling notification. It is clear that a predefinition manner helps reduce a signaling exchange process, and a configuration manner is more flexible.

For example, frequency reference points used by a plurality of network devices that need to measure each other may be configured by a control node at a higher layer than the network devices that measure each other, and the control node at a higher layer is, for example, a next generation core (NGC) node.

For another example, if a subordination relationship exists between network devices, frequency reference points used by network devices that need to measure each other may also be configured by a main control network device in the network devices, and then other network devices are notified of the configuration, so that the network devices have a same understanding of the frequency reference points.

For another example, when network devices are deployed, an engineer manually configures each network device. During configuration, a same frequency reference point may be configured for network devices that need to measure each other.

The foregoing several manners are merely examples. A configuration manner of a frequency reference point is not limited in this embodiment of this application. In an embodiment, a frequency reference point does not need to be predefined, so that selection of the frequency reference point is more flexible.

S53. The second network device determines a second frequency band used to receive the reference signal.

S51 and S52 are considered as a whole, and an execution sequence of S51 and S52, and S53 is not limited. For example, S51 and S52 may be performed before S53, or S51 and S52 may be performed after S53, or S51 and S52, and S53 may be simultaneously performed.

The second frequency band may be a working frequency band of the second network device. The working frequency band may also be referred to as a carrier frequency band, or may be a preconfigured or protocol-predefined frequency band used to receive the reference signal. This is not specifically limited. The first frequency band and the second frequency band may be a same frequency band and have a same frequency range, or may be different frequency bands. For example, the first frequency band and the second frequency band may overlap but do not completely overlap, that is, partially overlap.

S54. The first network device sends the reference signal in the first frequency band, and the second network device receives all or a part of the reference signal in the second frequency band.

After generating the reference signal, the first network device may send the reference signal in the first frequency band. A plurality of network devices may all receive the reference signal. The network devices may receive the reference signal in a same manner. Therefore, in this specification, an example in which the second network device receives the reference signal is used.

For example, the second network device may determine, based on the frequency reference point, a reference signal that needs to be detected in the second frequency band, and detect the reference signal. For example, the second network device may use a cross-correlation detection manner. Specifically, the second network device may locally generate a reference signal, and perform a cross-correlation operation by using the locally generated reference signal and a received signal. If a correlation peak value exceeds a specific threshold, the second network device may determine that the second network device receives the reference signal from the first network device.

To generate the reference signal, the second network device needs to determine at least one frequency reference point. In this case, the second network device may determine the at least one frequency reference point based on the second frequency band. Because frequency reference points in this embodiment of this application are all predefined or configured, the second network device determines the at least one frequency reference point based on the second frequency band. For a determining manner, refer to the foregoing manner in which the first network device determines the at least one frequency reference point based on the first frequency band in S51. In addition, the at least one frequency reference point determined by the second network device is the same as the at least one frequency reference point determined by the first network device. In this way, it can be ensured that the first network device and the second network device have a same understanding of the reference signal. In addition, the second network device may generate the reference signal based on the at least one determined frequency reference point. For a manner in which the second network device generates the reference signal based on the at least one frequency reference point, refer to the manner in which the first network device generates the reference signal based on the at least one frequency reference point in S52. Details are not described again.

Figure 8:
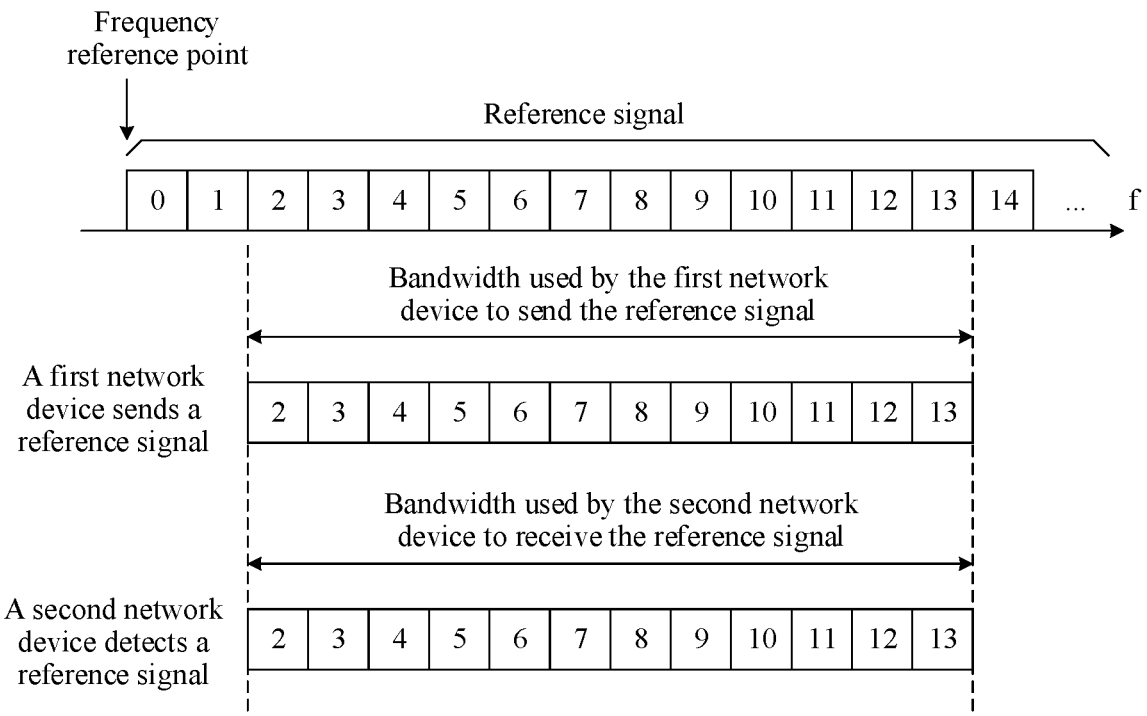
FIG. 8 is a schematic diagram of sending a reference signal by a first network device and detecting a reference signal by a second network device according to an embodiment of this application.

Referring to FIG. 8, for example, the working frequency band (e.g., the first frequency band) of the first network device and the working frequency band (e.g., the second frequency band) of the second network device are a same frequency band. It can be learned based on the frequency reference point that the first network device may send, in the first frequency band, a reference signal whose related numbers are 2 to 13, and the second network device detects, in the second frequency band, a reference signal whose related numbers are also 2 to 13. For example, the second network device may generate, in advance, a reference signal whose related numbers are 2 to 13. After detecting the signal in the second frequency band, the second network device may perform the cross-correlation operation by using the detected signal and the generated reference signal whose related numbers are 2 to 13. If a correlation peak value is greater than or equal to the specific threshold, the second network device determines that the second network device receives the reference signal whose related numbers are 2 to 13 and that is from the first network device. A number in FIG. 8 may be considered as a number of a subcarrier, a number of a carrier, a number of an element included in a reference signal sequence, or the like. In FIG. 8, an example in which the first frequency band and the second frequency band are exactly aligned is used. Therefore, the second network device can receive all of the reference signal. Alternatively, referring to FIG. 9, the second network device may receive a part of the reference signal.

Figure 9:
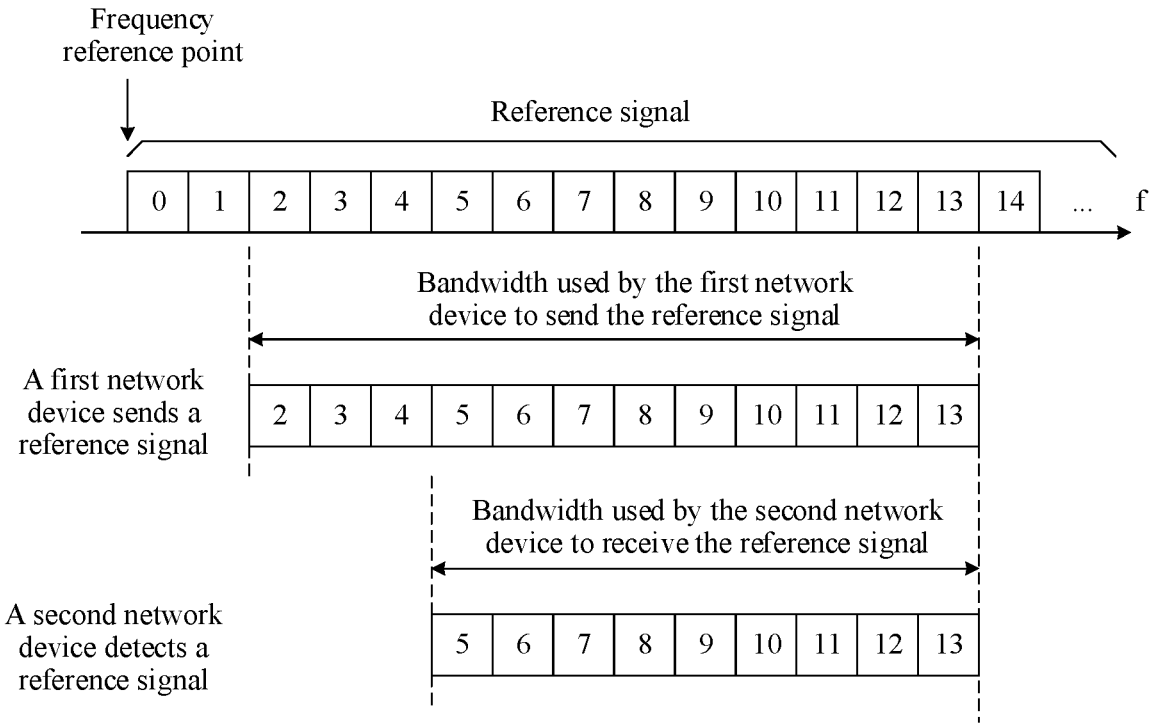
FIG. 9 is another schematic diagram of sending a reference signal by a first network device and detecting a reference signal by a second network device according to an embodiment of this application.

In FIG. 9, for example, the working frequency band (e.g., the first frequency band) of the first network device and the working frequency band (e.g., the second frequency band) of the second network device are not a same frequency band, and the two frequency bands have an intersection. It can be learned based on the frequency reference point that the first network device may send, in the first frequency band, a reference signal whose related numbers are 2 to 13, and the second network device detects, in the second frequency band, a reference signal whose related numbers are 5 to 13. For example, the second network device may generate, in advance, a reference signal whose related numbers are 5 to 13. After detecting the signal in the second frequency band, the second network device may perform the cross-correlation operation by using the detected signal and the generated reference signal whose related numbers are 5 to 13. If a correlation peak value is greater than or equal to the specific threshold, the second network device determines that the second network device receives the reference signal whose related numbers are 5 to 13 and that is from the first network device. A number in FIG. 9 may be considered as a number of a subcarrier, a number of a carrier, a number of an element included in a reference signal sequence, or the like.

It should be noted that a sequence of steps S51 to S54 is not limited in this specification. For example, S51 and S52 are considered as a whole, which, for example, is referred to as a first part of steps, and S53 and S54 are considered as a whole, which, for example, is referred to as a second part of steps. In this case, an execution time point of the first part of steps may be earlier than an execution time point of the second part of steps, or an execution time point of the second part of steps may be earlier than an execution time point of the first part of steps, or the first part of steps and the second part of steps may be performed simultaneously. For example, if a distance between the first network device and the second network device is relatively long, and the second network device is uncertain about whether or when the reference signal from the first network device is transmitted, the second network device may detect whether the reference signal exists at all receiving time periods. In this case, the second part of steps may be performed before the first part of steps. Certainly, although the second network device starts detection early, the second network device can detect the reference signal only after the reference signal of the first network device arrives at the second network device. In other words, a step in which the second network device successfully receives the reference signal should occur after the first part of steps. For another example, if the first network device and the second network device are adjacent network devices, a transmission delay between the first network device and the second network device is very low and may be ignored, and the first network device and the second network device have configured and determined a sending time/an arrival time of the reference signal. In this case, it may be considered that the first part of steps and the second part of steps are synchronously performed.

In conclusion, according to the technical solutions provided in this embodiment of this application, the reference signals received and sent by the network devices can be aligned, so that a process such as measurement between the network devices is implemented.

The following describes an apparatus provided in the embodiments of this application with reference to the accompanying drawings.

Figure 10:
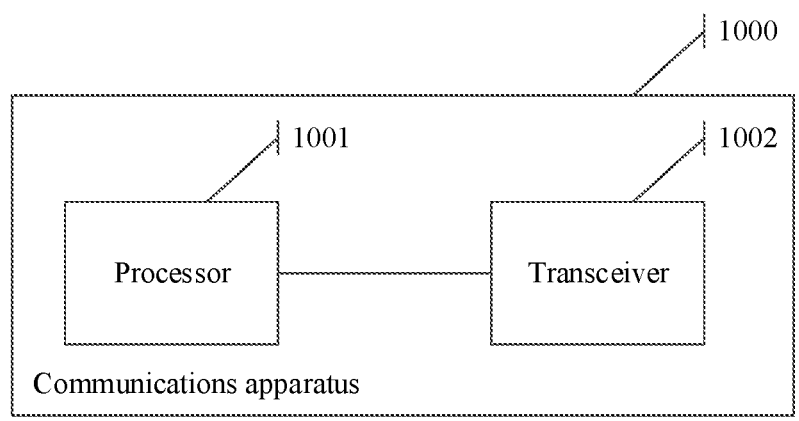
FIG. 10 is a schematic diagram of a communications apparatus that can implement a function of a first network device according to an embodiment of this application.

FIG. 10 is a schematic structural diagram of a communications apparatus 1000. The communications apparatus 1000 may implement functions of the first network device described above. The communications apparatus 1000 may be the first network device described above, or may be a chip disposed in the first network device described above. The communications apparatus 1000 may include a processor 1001 and a transceiver 1002. The processor 1001 may be configured to perform S51 and S52 in the embodiment shown in FIG. 5, and/or configured to support another process of the technology described in this specification. The transceiver 1002 may be configured to perform S54 in the embodiment shown in FIG. 5, and/or configured to support another process of the technology described in this specification.

For example, the processor 1001 is configured to determine at least one frequency reference point based on a first frequency band.

The processor 1001 is further configured to generate a reference signal based on the at least one frequency reference point.

The transceiver 1002 is configured to send the reference signal in the first frequency band.

All related content of the steps in the foregoing method embodiments may be cited in function descriptions of corresponding function modules. Details are not described herein again.

Figure 11:
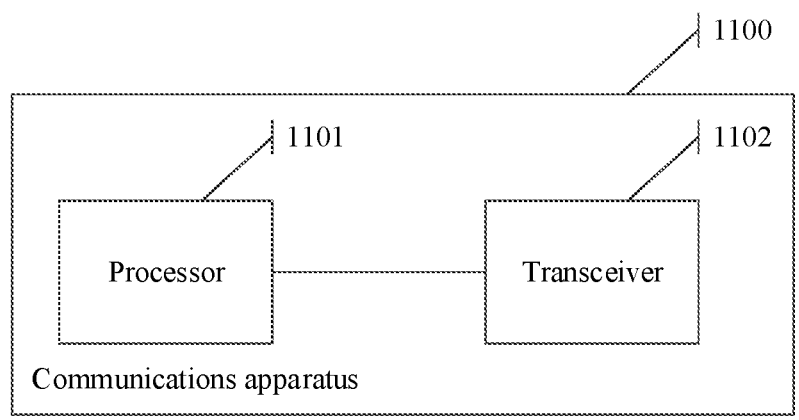
FIG. 11 is a schematic diagram of a communications apparatus that can implement a function of a second network device according to an embodiment of this application.

FIG. 11 is a schematic structural diagram of a communications apparatus 1100. The communications apparatus 1100 may implement functions of the second network device described above. The communications apparatus 1100 may be the second network device described above, or may be a chip disposed in the second network device described above. The communications apparatus 1100 may include a processor 1101 and a transceiver 1102. The processor 1101 may be configured to perform S53 in the embodiment shown in FIG. 5, and/or configured to support another process of the technology described in this specification, for example, a process of determining at least one frequency reference point based on a second frequency band, and a process of generating a reference signal based on the at least one frequency reference point. The transceiver 1102 may be configured to perform S54 in the embodiment shown in FIG. 5, and/or configured to support another process of the technology described in this specification.

For example, the processor 1101 is configured to determine the second frequency band used to receive the reference signal.

The transceiver 1102 is configured to receive a part or all of the reference signal in the second frequency band, where the reference signal is generated based on the at least one frequency reference point, and the at least one frequency reference point is determined based on the second frequency band.

All related content of the steps in the foregoing method embodiments may be cited in function descriptions of corresponding function modules. Details are not described herein again.

Figure 12A:
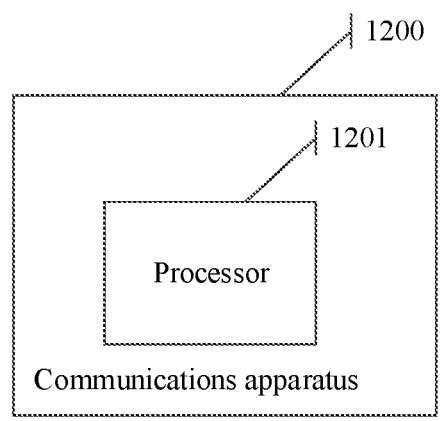
FIG. 12A and FIG. 12B are two schematic diagrams of a communications apparatus according to an embodiment of this application.

In a simple embodiment, a person skilled in the art can figure out that the communications apparatus 1000 or the communications apparatus 1100 may alternatively be implemented by using a structure of a communications apparatus 1200 shown in FIG. 12A. The communications apparatus 1200 may implement functions of the terminal device or the network device described above. The communications apparatus 1200 may include a processor 1201.

When the communications apparatus 1200 is configured to implement the functions of the first network device described above, the processor 1201 may be configured to perform S51 and S52 in the embodiment shown in FIG. 5, and/or configured to support another process of the technology described in this specification. Alternatively, when the communications apparatus 1200 is configured to implement the functions of the second network device described above, the processor 1201 may be configured to perform S53 in the embodiment shown in FIG. 5, and/or configured to support another process of the technology described in this specification.

The communications apparatus 1200 may be implemented by a field programmable gate array (FPGA), an application-specific integrated circuit (ASIC), a system on chip (SoC), a central processing unit (CPU), a network processor (NP), a digital signal processing circuit (DSP), a micro controller unit (MCU), programmable logic device (PLD), or another integrated chip. The communications apparatus 1200 may be disposed in the first network device or the second network device in the embodiments of this application, so that the first network device or the second network device implements the method provided in the embodiments of this application.

In an embodiment, the communications apparatus 1200 may include a transceiver component, configured to communicate with another device. When the communications apparatus 1200 is configured to implement the functions of the first network device or the second network device described above, the transceiver component may be configured to perform S54 in the embodiment shown in FIG. 5, and/or configured to support another process of the technology described in this specification. For example, one transceiver component is a communications interface. If the communications apparatus 1200 is the first network device or the second network device, the communications interface may be a transceiver in the first network device or a transceiver in the second network device, for example, a transceiver 1001 or a transceiver 1102, and the transceiver is, for example, a radio frequency transceiver component in the first network device or the second network device. Alternatively, if the communications apparatus 1200 is a chip disposed in the first network device or the second network device, the communications interface may be an input/output interface, for example, an input/output pin, of the chip.

Figure 12B:
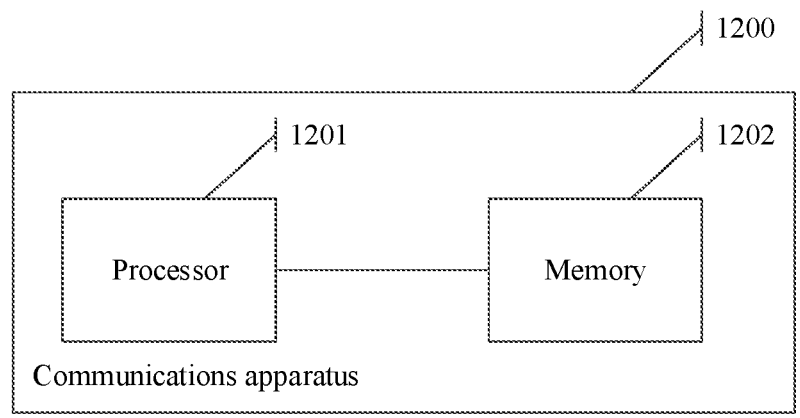

In an embodiment, referring to FIG. 12B, the communications apparatus 1200 may further include a memory 1202. The memory 1202 is configured to store computer programs or instructions, and the processor 1201 is configured to decode and execute the computer programs or the instructions. It should be understood that the computer programs or the instructions may include function programs of the first network device or the second network device. When the function programs of the first network device are decoded and executed by the processor 1201, the first network device can implement functions of the first network device in the method provided in the embodiment shown in FIG. 5 in the embodiments of this application. When the function programs of the second network device are decoded and executed by the processor 1201, the second network device can implement functions of the second network device in the method provided in the embodiment shown in FIG. 5 in the embodiments of this application.

In another embodiment, the function programs of the first network device or the second network device are stored in an external memory of the communications apparatus 1200. When the function programs of the first network device are decoded and executed by the processor 1201, the memory 1202 temporarily stores some or all content of the function programs of the first network device. When the function programs of the second network device are decoded and executed by the processor 1201, the memory 1202 temporarily stores some or all content of the function programs of the second network device.

In another embodiment, the function programs of the first network device or the second network device are set to be stored in the internal memory 1202 of the communications apparatus 1200. When the internal memory 1202 of the communications apparatus 1200 stores the function programs of the first network device, the communications apparatus 1200 may be disposed in the first network device in the embodiments of this application. When the internal memory 1202 of the communications apparatus 1200 stores the function programs of the second network device, the communications apparatus 1200 may be disposed in the second network device in the embodiments of this application.

In still another embodiment, some content of the function programs of the first network device is stored in an external memory of the communications apparatus 1200, and other content of the function programs of the first network device is stored in the internal memory 1202 of the communications apparatus 1200. Alternatively, some content of the function programs of the second network device is stored in an external memory of the communications apparatus 1200, and other content of the function programs of the second network device is stored in the internal memory 1202 of the communications apparatus 1200.

In the embodiments of this application, the communications apparatus 1000, the communications apparatus 1100, and the communications apparatus 1200 are presented in a form in which each function module is obtained through division based on each function, or may be presented in a form in which each function module is obtained through division in an integrated manner. The "module" herein may be an ASIC, a processor and a memory that execute one or more software or firmware programs, an integrated logic circuit, and/or another component that can provide the foregoing functions.

In addition, the communications apparatus 1000 provided in the embodiment shown in FIG. 10 may alternatively be implemented in another form. For example, the communications apparatus includes a processing module and a transceiver module. For example, the processing module may be implemented by the processor 1001, and the transceiver module may be implemented by the transceiver 1002. The processing module may be configured to perform S51 and S52 in the embodiment shown in FIG. 5, and/or configured to support another process of the technology described in this specification. The transceiver module may be configured to perform S54 in the embodiment shown in FIG. 5, and/or configured to support another process of the technology described in this specification.

For example, the processing module is configured to determine at least one frequency reference point based on a first frequency band.

The processing module is further configured to generate a reference signal based on the at least one frequency reference point.

The transceiver module is configured to send the reference signal in the first frequency band.

All related content of the steps in the foregoing method embodiments may be cited in function descriptions of corresponding function modules. Details are not described herein again.

Similarly, the communications apparatus 1100 provided in the embodiment shown in FIG. 11 may alternatively be implemented in another form. For example, the communications apparatus includes a processing module and a transceiver module. For example, the processing module may be implemented by the processor 1101, and the transceiver module may be implemented by the transceiver 1102. The processing module may be configured to perform S53 in the embodiment shown in FIG. 5, and/or configured to support another process of the technology described in this specification. The transceiver module may be configured to perform S54 in the embodiment shown in FIG. 5, and/or configured to support another process of the technology described in this specification.

For example, the processing module is configured to determine a second frequency band used to receive a reference signal.

The transceiver module is configured to receive a part or all of the reference signal in the second frequency band, where the reference signal is generated based on at least one frequency reference point, and the at least one frequency reference point is determined based on the second frequency band.

All related content of the steps in the foregoing method embodiments may be cited in function descriptions of corresponding function modules. Details are not described herein again.

The communications apparatus 1000, the communications apparatus 1100, and the communications apparatus 1200 provided in the embodiments of this application may be configured to perform the method provided in the embodiment shown in FIG. 5. Therefore, for technical effects that can be achieved by the communications apparatus 1000, the communications apparatus 1100, and the communications apparatus 1200, refer to the foregoing method embodiments. Details are not described herein again.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of any other programmable data processing device to generate a machine, so that the instructions executed by the computer or the processor of the any other programmable data processing device generate an apparatus for implementing a specific function in one or more processes in the flowcharts and/or in one or more blocks in the block diagrams.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedure or the functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

It is clear that a person skilled in the art can make various modifications and variations to the embodiments of this application without departing from the spirit and scope of this application. In this way, this application is intended to cover these modifications and variations made to the embodiments of this application provided that they fall within the scope of the claims of this application and their equivalent technologies.

What is claimed is:

1. A reference signal sending method, comprising:
    determining by a first access network device, at least one frequency reference point, the at least one frequency reference point is configured for a reference signal in a first frequency band;
    generating by the first access network device, the reference signal directly based on the at least one frequency reference point; and
    sending by the first access network device, the reference signal in the first frequency band to a second access network device; the reference signal is for interference measurement between the first access network device and the second access network device.

2. The method according to claim 1, wherein the determining by a first access network device, at least one frequency reference point comprises:
    determining by the first access network device, the at least one frequency reference point based on a frequency interval in which the first frequency band is located, wherein the frequency interval is obtained by dividing frequencies according to a predefined rule, and the at least one frequency reference point is predefined or configured for the frequency interval.

3. The method according to claim 2, wherein
    the reference signal is determined based on one frequency reference point, and a frequency of the frequency reference point is the lowest frequency in the frequency interval, or a frequency that is less than the lowest frequency in the frequency interval.

4. A reference signal receiving method, comprising:
    determining by a second access network device, a second frequency band used to receive a reference signal; and
    receiving by a second access network device from a first access network device, at least a portion of the reference signal in the second frequency band, wherein the reference signal is generated directly based on at least one frequency reference point, the at least one frequency reference point is configured for the reference signal that is in the second frequency band, the reference signal is for interference measurement between the first access network device and the second access network device.

5. The method according to claim 4, wherein
    the at least one frequency reference point is determined based on a frequency interval in which the second frequency band is located, the frequency interval is obtained by dividing frequencies according to a predefined rule, and the at least one frequency reference point is predefined or configured for the frequency interval.

6. The method according to claim 5, wherein
    the reference signal is determined based on one frequency reference point, and a frequency of the frequency reference point is the lowest frequency in the frequency interval, or a frequency that is less than the lowest frequency in the frequency interval.

7. A first access network device, comprising:
    a processor, configured to determine at least one frequency reference point, the at least one frequency reference point configured for a reference signal in a first frequency band, and generate the reference signal based on the at least one frequency reference point; and
    a transceiver, configured to send the reference signal in the first frequency band; the reference signal is for interference measurement between the first access network device and a second access network device.

8. The first access network device according to claim 7, wherein determining the at least one frequency reference point comprises:
    determining the at least one frequency reference point based on a frequency interval in which the first frequency band is located, wherein the frequency interval is obtained by dividing frequencies according to a predefined rule, and the at least one frequency reference point is predefined or configured for the frequency interval.

9. The first access network device according to claim 8, wherein
    the reference signal is determined based on one frequency reference point, and a frequency of the frequency reference point is the lowest frequency in the frequency interval, or a frequency that is less than the lowest frequency in the frequency interval.

10. A second access network device, comprising:
    a processor to determine a second frequency band used to receive a reference signal; and
    a transceiver to receive at least a portion of the reference signal in the second frequency band, wherein the reference signal is generated based on at least one frequency reference point; the at least one frequency reference point is configured for the reference signal that is in the second frequency band, the reference signal is for interference measurement between a first access network device and the second access network device.

11. The second access network device according to claim 10, wherein
    the at least one frequency reference point is determined based on a frequency interval in which the second frequency band is located, the frequency interval is obtained by dividing frequencies according to a predefined rule, and the at least one frequency reference point is predefined or configured for the frequency interval.

12. The second access network device according to claim 11, wherein
the reference signal is determined based on one frequency reference point, and a frequency of the frequency reference point is the lowest frequency in the frequency interval, or a frequency that is less than the lowest frequency in the frequency interval.

* * * * *